US012737117B2

(12) United States Patent
Hiwada

(10) Patent No.: US 12,737,117 B2
(45) Date of Patent: Sep. 15, 2026

(54) MEMORY SYSTEM

(71) Applicant: Kioxia Corporation, Tokyo (JP)

(72) Inventor: Kazuhiro Hiwada, Kamakura (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/631,430

(22) Filed: Apr. 10, 2024

(65) Prior Publication Data

US 2024/0345734 A1 Oct. 17, 2024

(30) Foreign Application Priority Data

Apr. 12, 2023 (JP) ................................ 2023-064961

(51) Int. Cl.
*G06F 3/06* (2006.01)

(52) U.S. Cl.
CPC .......... *G06F 3/0611* (2013.01); *G06F 3/0656* (2013.01); *G06F 3/0659* (2013.01); *G06F 3/0679* (2013.01)

(58) Field of Classification Search
CPC .... G06F 3/0611; G06F 3/0656; G06F 3/0659; G06F 3/0679
See application file for complete search history.

(56) References Cited

U.S. PATENT DOCUMENTS 10,002,671 B2 6/2018 Shimizu et al.
2002/0035671 A1* 3/2002 Kametani .......... G06F 12/0831 711/E12.033
2007/0239926 A1* 10/2007 Gyl ...................... G11C 7/1075 711/103
2011/0060927 A1* 3/2011 Fillingim ............ G06F 11/3034 713/320
2012/0144134 A1* 6/2012 Niwa ..................... G11C 29/74 711/155
2015/0154108 A1* 6/2015 Gorobets ............ G06F 12/0246 711/103
2017/0140823 A1* 5/2017 Missiroli ............... G11C 16/26
2018/0121136 A1 5/2018 Ishiyama
2018/0275918 A1* 9/2018 Tanefusa ............... G06F 3/0659
2019/0079676 A1* 3/2019 Seo ....................... G06F 3/0688

(Continued)

FOREIGN PATENT DOCUMENTS

JP 6753746 B2 9/2020
JP 2023042992 A 3/2023

OTHER PUBLICATIONS

Presentation titled 19.3 Scheduling Jobs to Minimize Average Waiting Time for CS/ECE 374, Fall 2020 (Year: 2020).*

*Primary Examiner* — Janice M. Girouard
(74) *Attorney, Agent, or Firm* — Maier & Maier, PLLC

(57) ABSTRACT

According to one embodiment, a memory system includes a plurality of memory chips each including a first memory area and a second memory area and a memory controller. The memory controller is configured to control a first group including a plurality of first memory areas and a second group including a plurality of second memory areas independently of each other, form a data group including a plurality of write data items of respective pages and first data including an erasure correction code corresponding to the write data items, and distribute each of the write data items and the first data of the data group in the plurality of first memory areas of the first group to write the distributed write data items and first data at different timings.

20 Claims, 27 Drawing Sheets

(56) References Cited

U.S. PATENT DOCUMENTS

| | | | | |
|---|---|---|---|---|
| 2021/0055986 | A1* | 2/2021 | Lam | G06F 11/1044 |
| 2021/0064287 | A1* | 3/2021 | Kanno | G06F 3/0659 |
| 2021/0191752 | A1* | 6/2021 | Moss | G06F 9/4881 |
| 2021/0223998 | A1 | 7/2021 | Li et al. | |
| 2022/0035566 | A1* | 2/2022 | Henze | G06F 3/061 |
| 2022/0035569 | A1 | 2/2022 | Smith | |
| 2022/0365719 | A1* | 11/2022 | Sun | G06F 3/0659 |
| 2023/0090008 | A1 | 3/2023 | Kajihara | |

* cited by examiner

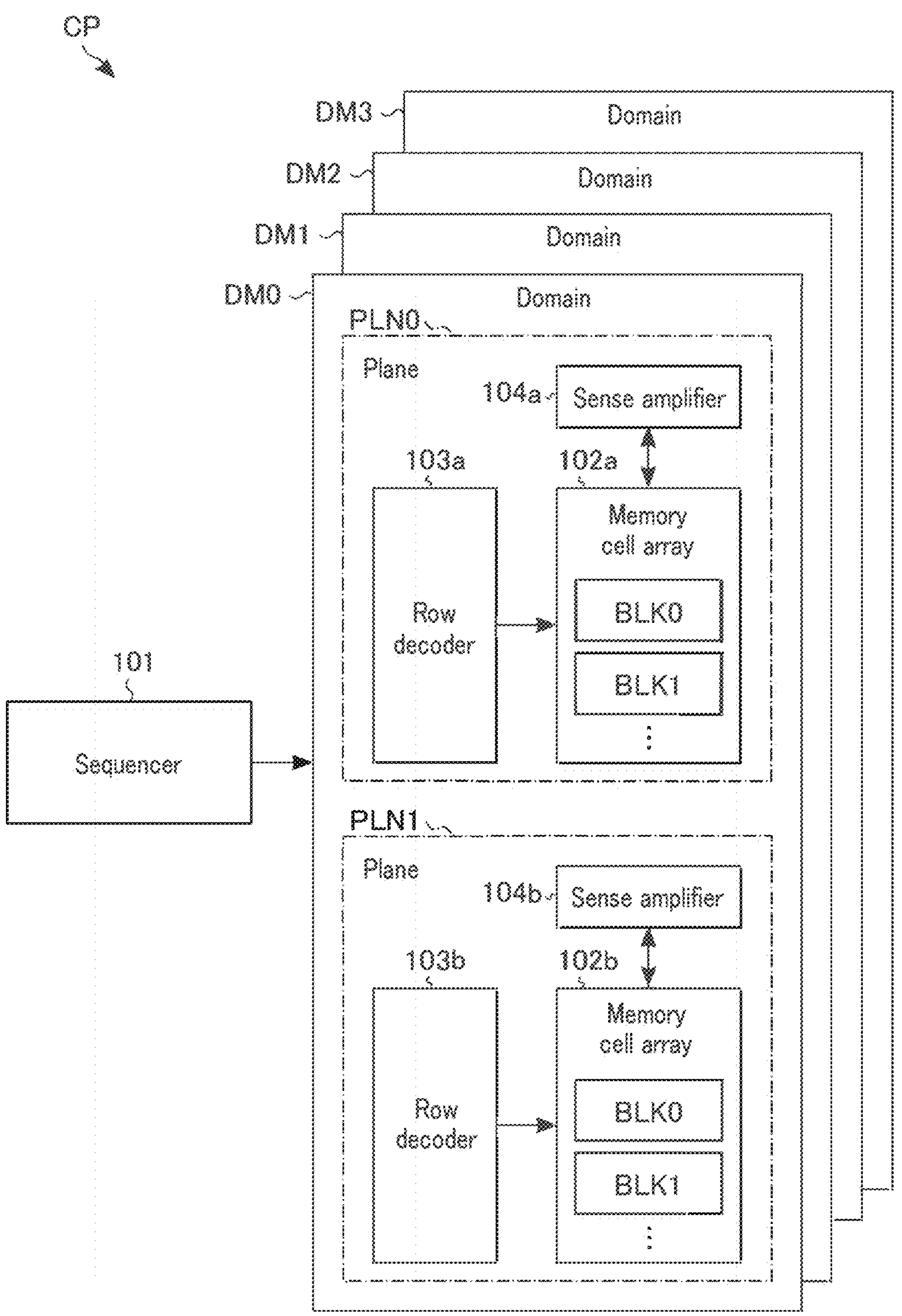
F I G. 2

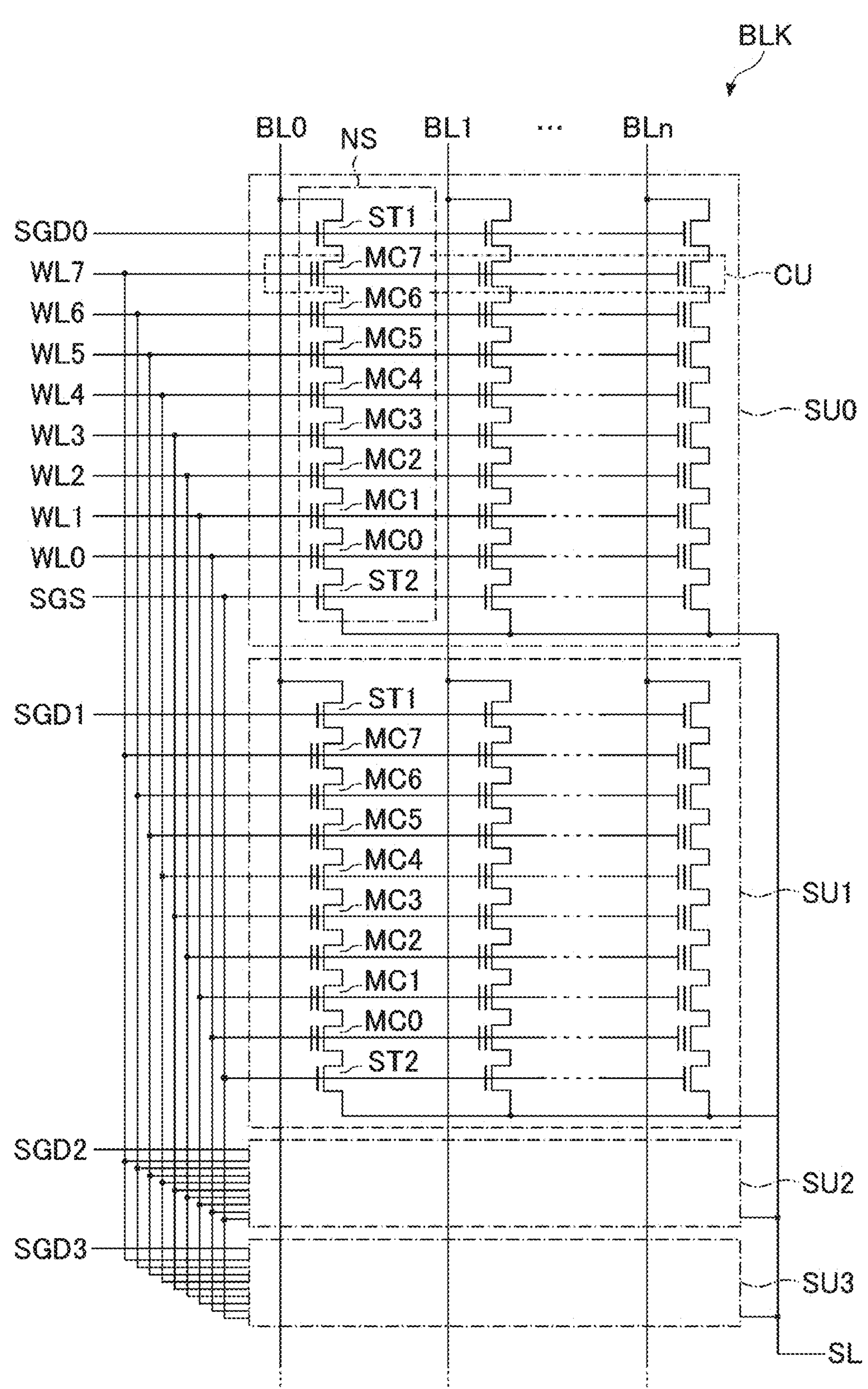
F I G. 3

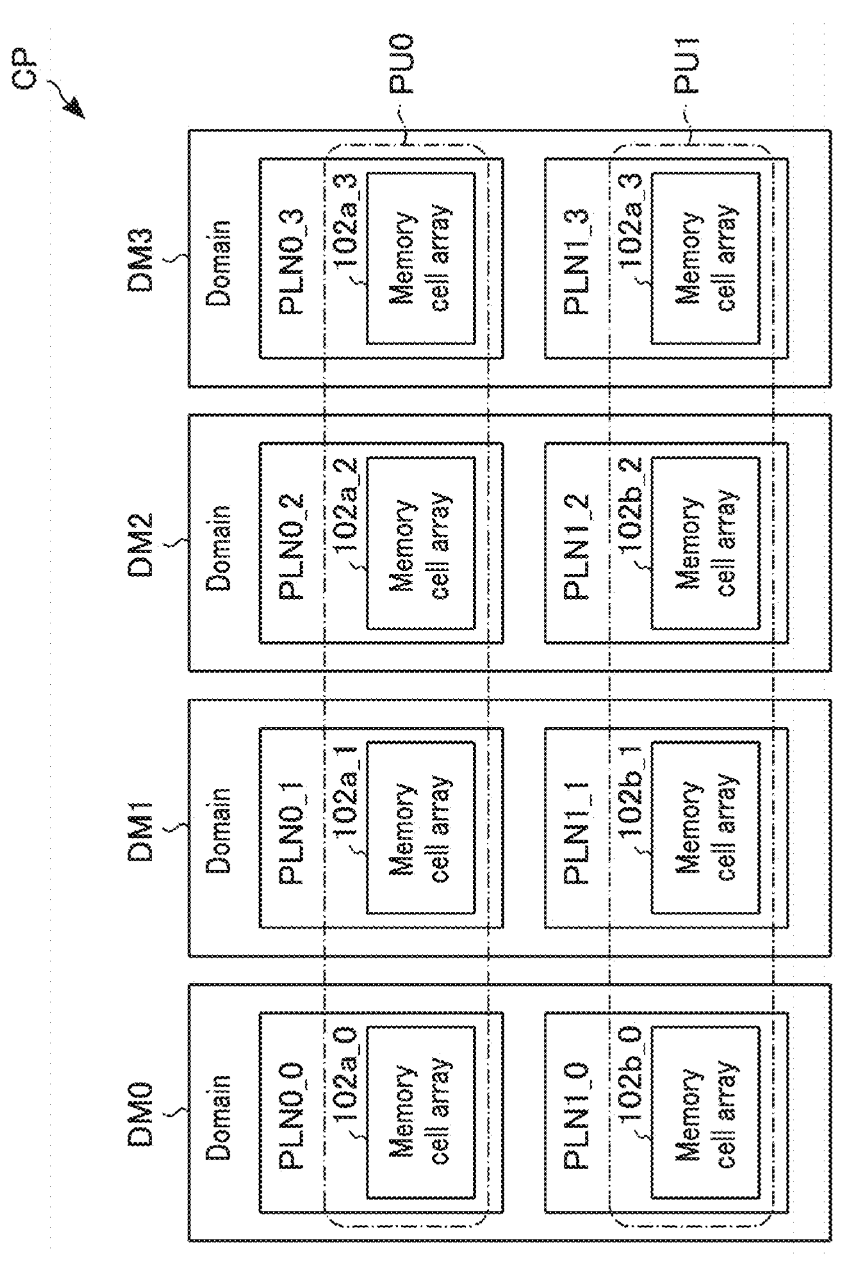
F I G. 4

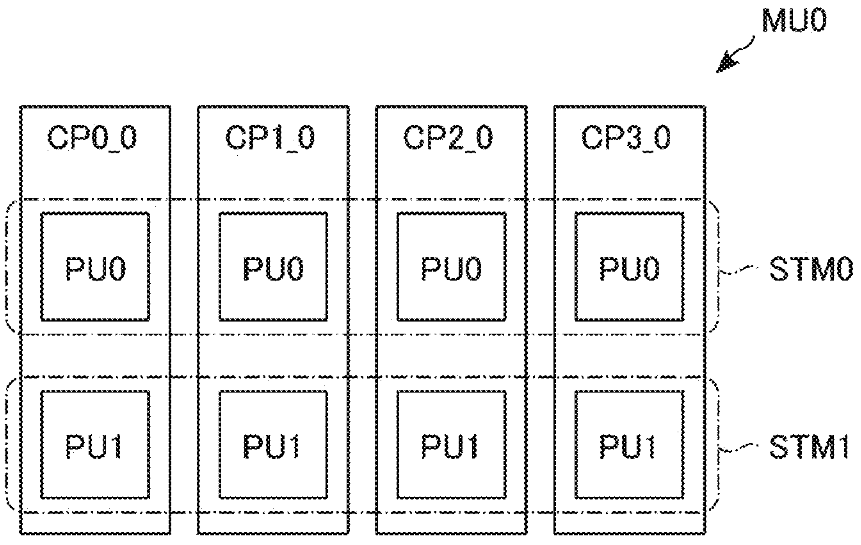
F I G. 6
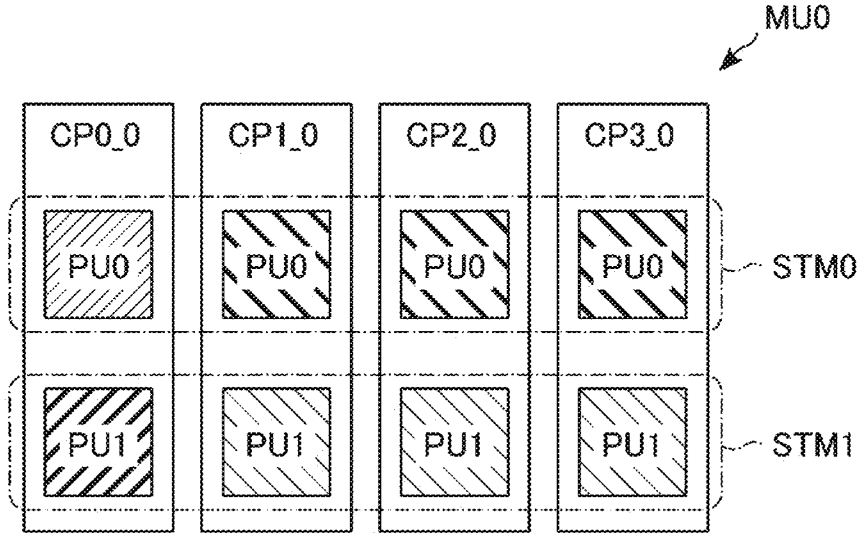
: Write operation or erase operation is being performed
: Neither write operation nor erase operation can be performed
: Write operation and erase operation can be performed in another domain
: Write operation and erase operation can be performed
F I G. 7

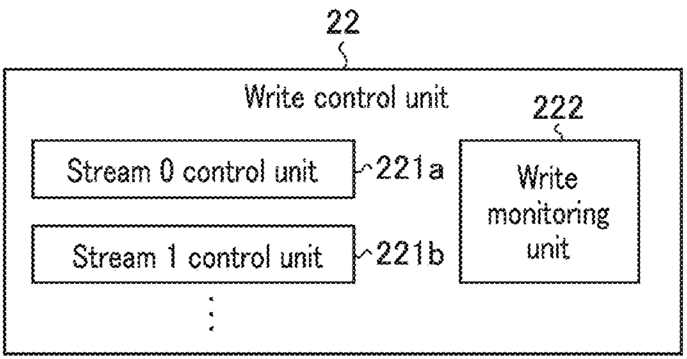
F I G. 8
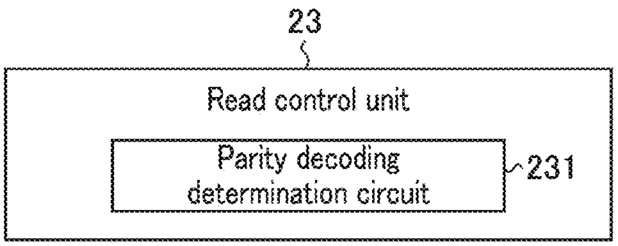
F I G. 9
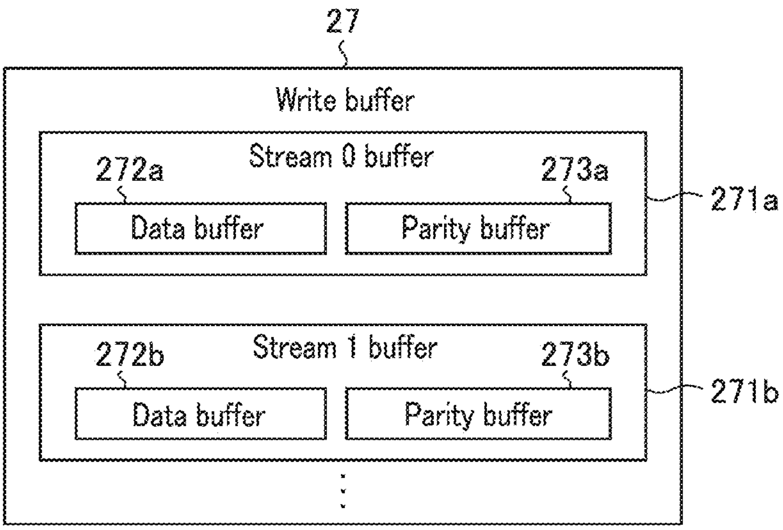
F I G. 10

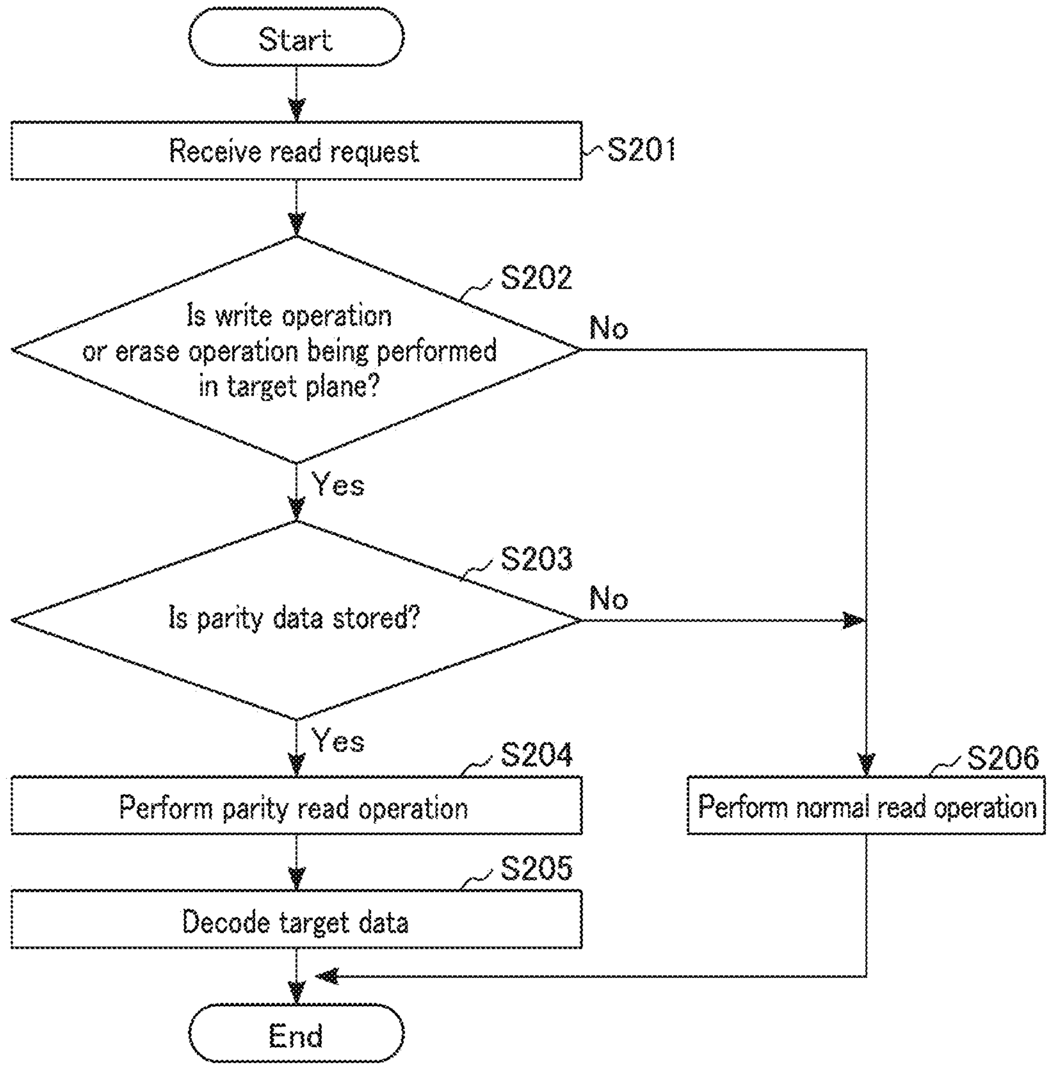
F I G. 14

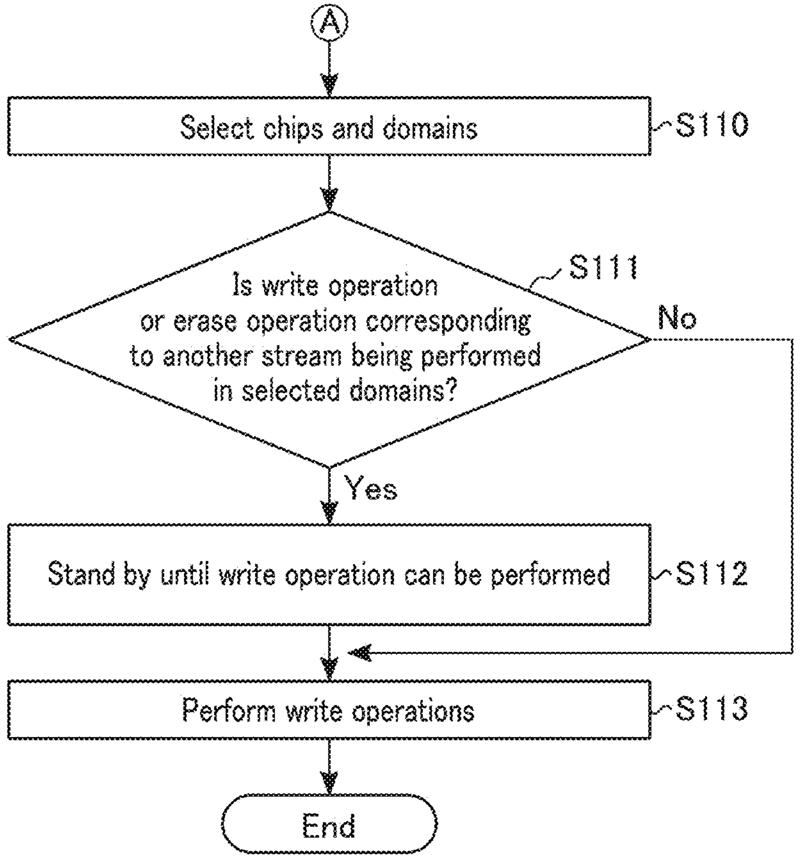
F I G. 19

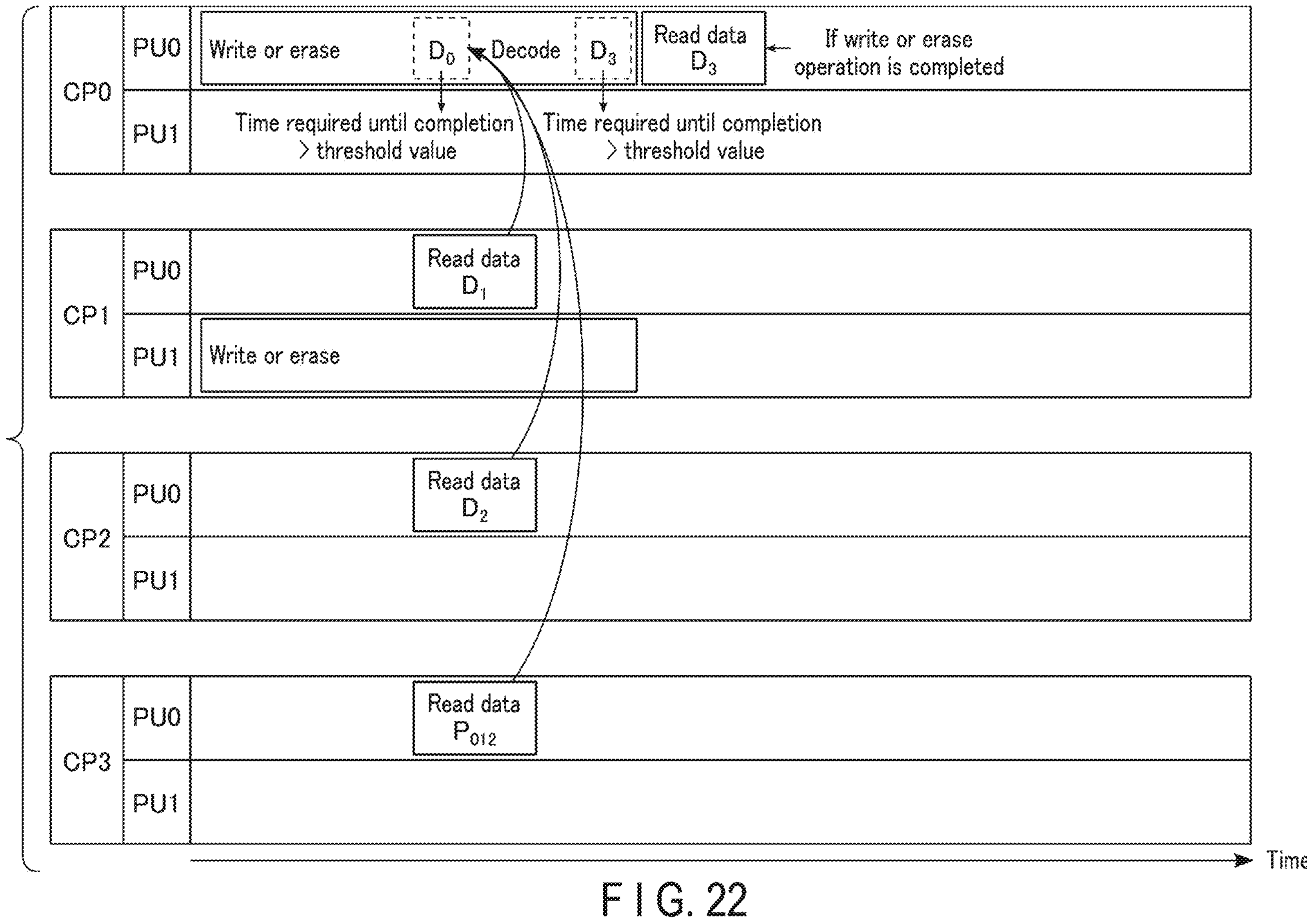
F I G. 22

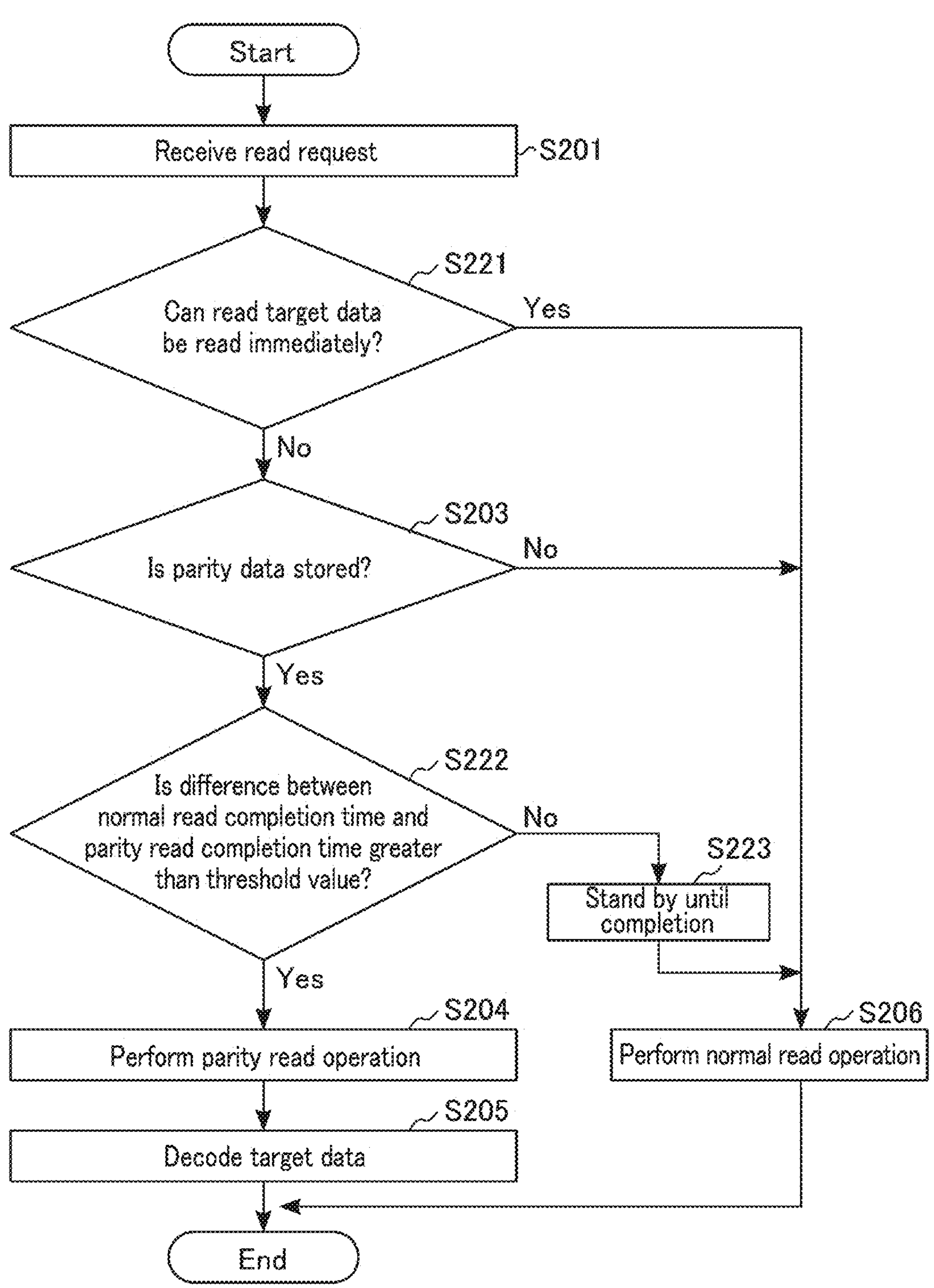
F I G. 23

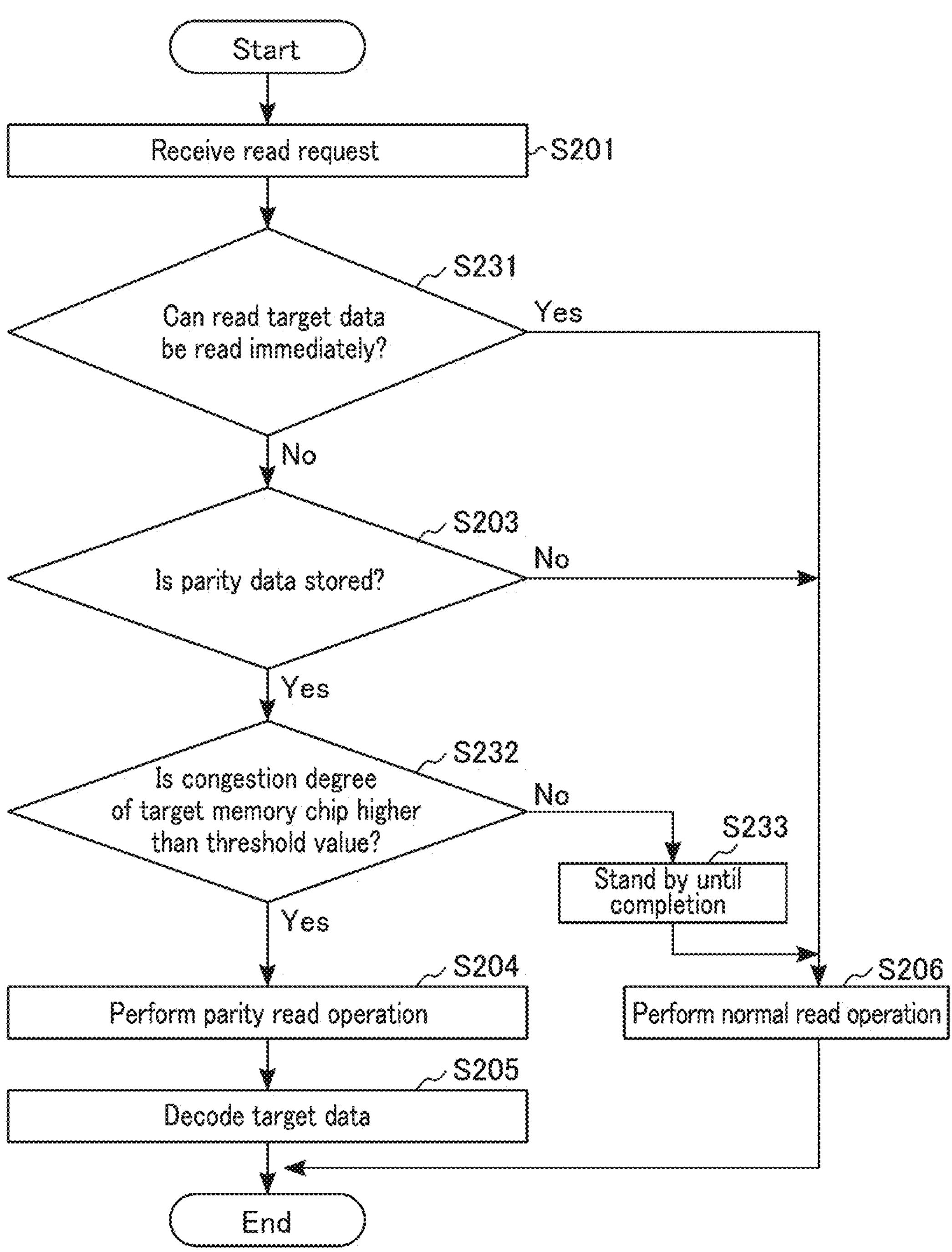
F I G. 24

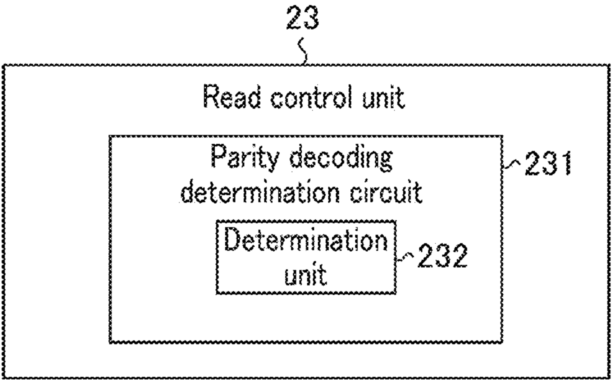
F I G. 26

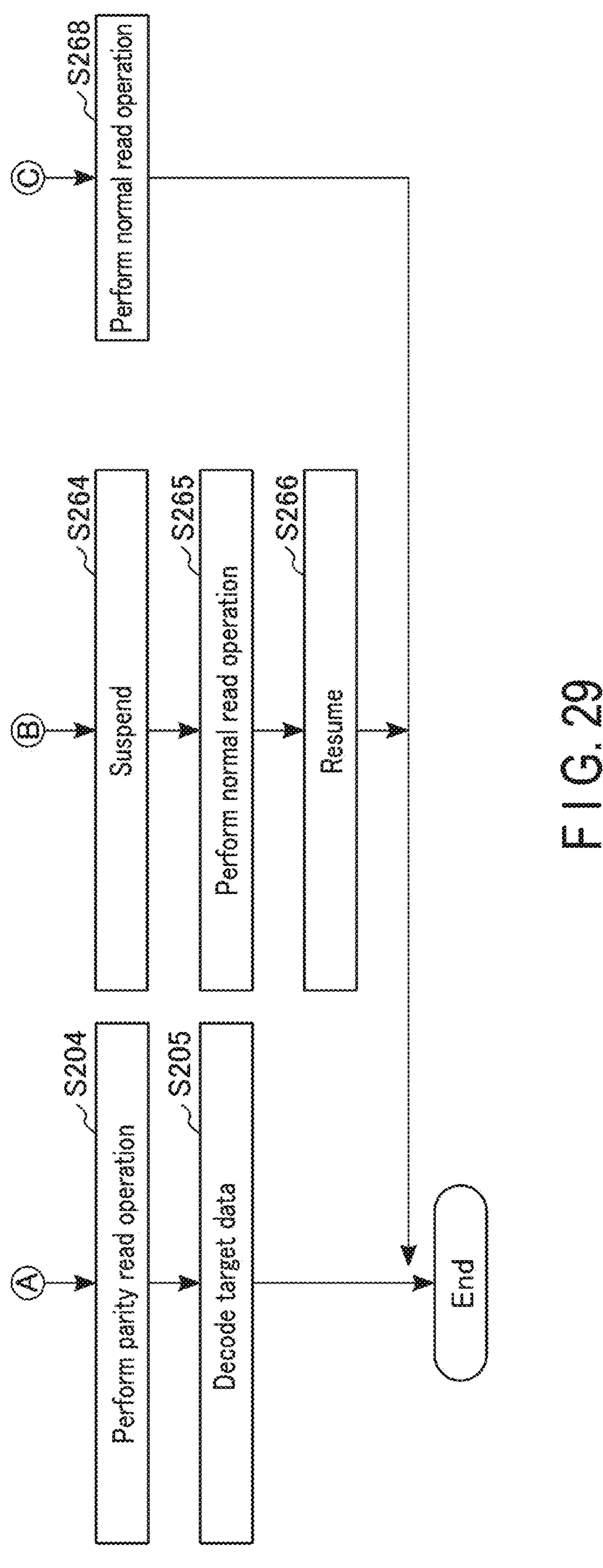
F I G. 29

MEMORY SYSTEM

CROSS-REFERENCE TO RELATED APPLICATION

This application is based upon and claims the benefit of priority from prior Japanese Patent Application No. 2023-064961, filed Apr. 12, 2023, the entire contents of which are incorporated herein by reference.

FIELD

Embodiments described herein relate generally to a memory system.

BACKGROUND

A memory system such as a solid state drive (SSD) including a NAND flash memory is known.

BRIEF DESCRIPTION OF THE DRAWING(S)

FIG. 2 is a block diagram showing a basic configuration of a memory chip included in the memory system according to the first embodiment.

FIG. 3 is a circuit diagram of a memory cell array included in the memory system according to the first embodiment.

FIG. 4 is a diagram showing an arrangement of memory areas of the memory chip included in the memory system according to the first embodiment.

FIG. 6 is a diagram showing an arrangement of memory areas of a memory unit included in the memory system according to the first embodiment.

FIG. 7 is a diagram showing a specific example of an operation in the memory unit included in the memory system according to the first embodiment.

FIG. 8 is a block diagram showing a configuration of a write control unit included in the memory system according to the first embodiment.

FIG. 9 is a block diagram showing a configuration of a read control unit included in the memory system according to the first embodiment.

FIG. 10 is a block diagram showing a configuration of a write buffer included in the memory system according to the first embodiment.

FIG. 14 is a flowchart of a read operation in the memory system according to the first embodiment.

FIG. 19 is a flowchart of the write operation in the memory system according to the third modification of the first embodiment.

FIG. 22 is a diagram showing a specific example of the read operation in the memory system according to the first example of the second embodiment.

FIG. 23 is a flowchart of a read operation in a memory system according to a second example of the second embodiment.

FIG. 24 is a flowchart of a read operation in a memory system according to a third example of the second embodiment.

FIG. 26 is a block diagram showing a configuration of a read control unit in a memory system according to a fifth example of the second embodiment.

FIG. 29 is a flowchart of the read operation in the memory system according to the sixth example of the second embodiment.

DETAILED DESCRIPTION

In general, according to one embodiment, a memory system includes a plurality of memory chips each including a first memory area and a second memory area and a memory controller. The memory controller is configured to control a first group including a plurality of first memory areas and a second group including a plurality of second memory areas independently of each other, form a data group including a plurality of write data items of respective pages and first data including an erasure correction code corresponding to the write data items, and distribute each of the write data items and the first data of the data group in the plurality of first memory areas of the first group to write the distributed write data items and first data at different timings.

Embodiments will be described below with reference to the drawings. The drawings are schematic. In the following descriptions, the elements having substantially the same function and configuration are denoted by the same symbol. The number subsequent to a letter or letters in a reference symbol is used to distinguish elements having the same configuration.

Below is a description of a memory system of each of the embodiments.

1. First Embodiment

1.1 Configuration

1.1.1 Configuration of Data Processing Device

Figure 1:
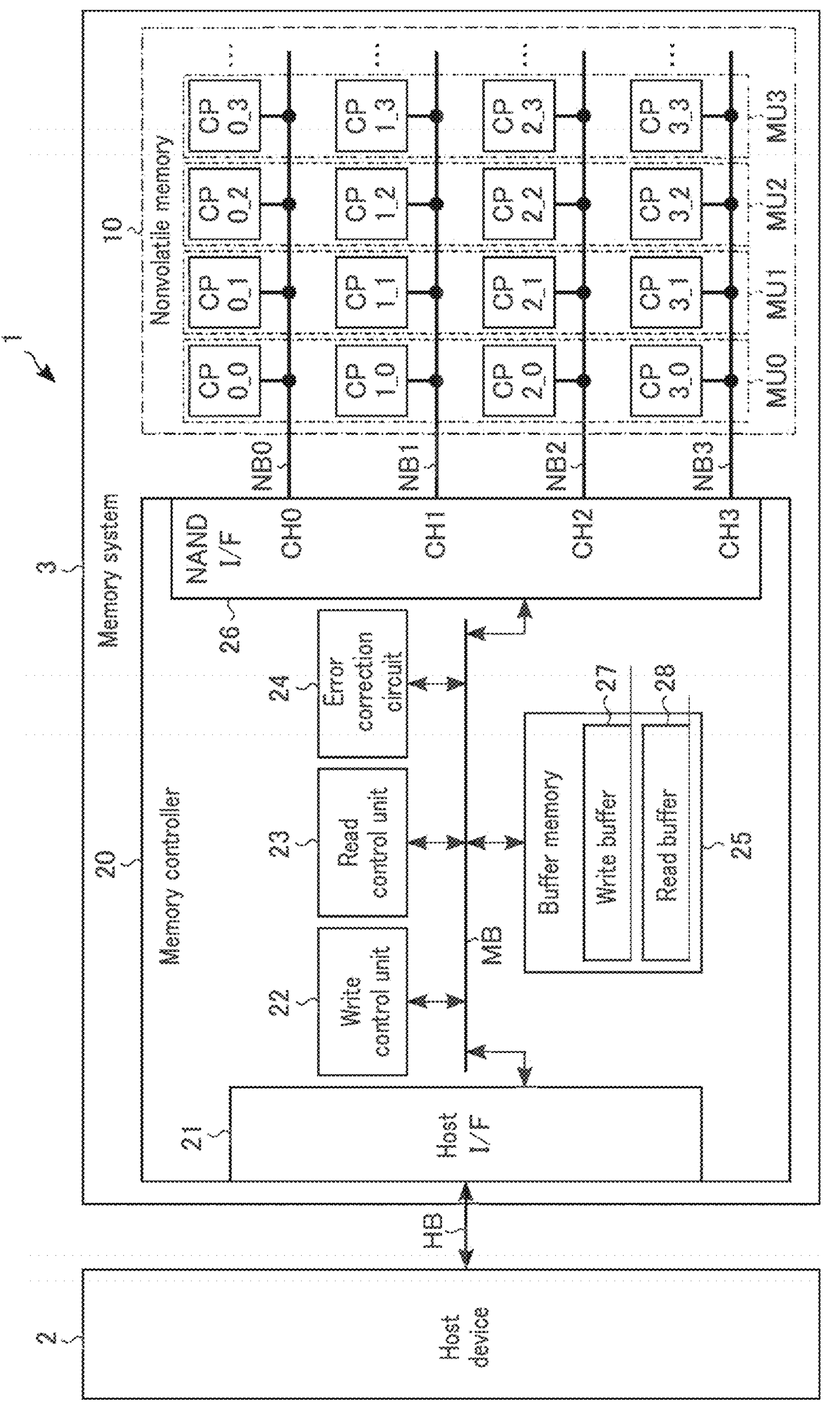
FIG. 1 is a block diagram showing the overall configuration of a data processing device including a memory system according to a first embodiment.

First, an example of the configuration of a data processing device 1 including a memory system will be described with reference to FIG. 1. FIG. 1 is a block diagram showing an example of the overall configuration of the data processing device 1.

As shown in FIG. 1, the data processing device 1 includes a host device 2 and a memory system 3. Note that a plurality of memory systems may be coupled to the host device 2.

The host device 2 is an information processing device (computing device) that accesses the memory system 3. The host device 2 controls the memory system 3. More specifically, for example, the host device 2 requests (instructs) the memory system 3 to perform a data write operation or a data read operation. That is, the host device 2 transmits a write request or a read request to the memory system 3. For example, the write request includes a command, an address and user data. The read request includes a command and an address.

The memory system 3 is, for example, a solid state drive (SSD) including a nonvolatile memory. The memory system 3 is coupled to the host device 2 via a host bus HB. Compute Express Link (CXL) (registered trademark) can be applied as a connection standard for interconnecting the memory system 3 and the host device 2. The connection standard is not limited to CXL. For example, the connection standard may be Peripheral Component Interconnect-Express (PCIe) (registered trademark). Note that the memory system 3 may be coupled to the host device 2 via a network or wireless communication.

1.1.2 Configuration of Memory System

An example of the configuration of the memory system 3 will be described below with reference to FIG. 1.

As shown in FIG. 1, the memory system 3 includes a nonvolatile memory 10 and a memory controller 20.

The nonvolatile memory 10 is a memory that is nonvolatile. The nonvolatile memory 10 includes a plurality of memory chips CP (also referred to simply as "chips"). The number of memory chips CP included in the nonvolatile memory 10 is arbitrary.

The memory chips CP are, for example, NAND flash memories. The memory chips CP may store data in a nonvolatile manner. The memory chips CP may operate independently of each other. The memory chips CP are coupled to the memory controller 20 via NAND buses NB. The number of NAND buses NB is arbitrary, as is the number of memory chips CP coupled to one NAND bus NB. In the example of FIG. 1, four NAND buses NB0 to NB3 are provided. Four memory chips CP are coupled to each of the NAND buses NB. More specifically, memory chips CP0_0, CP0_1, CP0_2, and CP0_3 are coupled to the memory controller 20 via the NAND bus NB0. Memory chips CP1_0, CP1_1, CP1_2, and CP1_3 are coupled to the memory controller 20 via the NAND bus NB1. Memory chips CP2_0, CP2_1, CP2_2, and CP2_3 are coupled to the memory controller 20 via the NAND bus NB2. Memory chips CP3_0, CP3_1, CP3_2, and CP3_3 are coupled to the memory controller 20 via the NAND bus NB3. If the memory chips CP0_0, CP0_1, CP0_2, and CP0_3 need not be distinguished from one another, they will be simply referred to as "memory chip CP0." If the memory chips CP1_0, CP1_1, CP1_2, and CP1_3 need not be distinguished from one another, they will be simply referred to as "memory chip CP1." If the memory chips CP2_0, CP2_1, CP2_2, and CP2_3 need not be distinguished from one another, they will be simply referred to as "memory chip CP2." If the memory chips CP3_0, CP3_1, CP3_2, and CP3_3 need not be distinguished from one another, they will be simply referred to as "memory chip CP3."

In the first embodiment, one memory unit MU is formed of a plurality of memory chips CP each of which is coupled to its corresponding NAND bus NB. For example, the memory unit MU is a unit of a plurality of memory chips CP corresponding to an erasure correction decoding process. The erasure correction decoding process is a process in which if there is a memory chip CP from which data cannot be read, the data is decoded based on data read from the other memory chips CP and an erasure correction code. In the example of FIG. 1, the memory unit MU0 includes memory chips CP0_0, CP1_0, CP2_0, and CP3_0. The memory unit MU1 includes memory chips CP0_1, CP1_1, CP2_1, and CP3_1. The memory unit MU2 includes memory chips CP0_2, CP1_2, CP2_2, and CP3_2. The memory unit MU3 includes memory chips CP0_3, CP1_3, CP2_3, and CP3_3.

Note that the configuration of the memory unit MU is arbitrary. For example, the memory unit MU may be formed of a plurality of memory chips CP coupled to one NAND bus NB. More specifically, one memory unit MU may be formed of, for example, memory chips CP0_0, CP0_1, CP0_2, and CP0_3. The memory unit MU may also be formed of a plurality of memory areas of one memory chip CP. In this case, the memory areas of the memory chip CP may operate independently of each other. Below is a description of a case in which a plurality of memory chips CP included in a memory unit MU are coupled to the memory controller 20 via different NAND buses NB. In this case, when the read data of the memory chips CP are transmitted at once to the memory controller 20, no collision occurs in the data transmission; thus, tail latency can be suppressed from increasing.

The memory controller 20 is, for example, a system on a chip (SoC). The memory controller 20 controls the nonvolatile memory 10 in response to a request (instruction) from the host device. More specifically, the memory controller 20 instructs the nonvolatile memory 10 to perform a data read operation, a data write operation, a data erase operation, and the like.

The memory controller 20 includes a host interface circuit 21, a write control unit 22, a read control unit 23, an error correction circuit 24, a buffer memory 25, and a NAND interface circuit 26. The host interface circuit 21, the write control unit 22, the read control unit 23, the error correction circuit 24, the buffer memory 25, and the NAND interface circuit 26 are coupled to each other via a memory bus MB so as to transmit and receive data to and from each other. Note that the functions of the write control unit 22, the read control unit 23, and the error correction circuit 24 may be performed by a dedicated circuit or by causing a processor (not shown) included in the memory controller 20 to execute firmware.

The host interface circuit 21 is a hardware interface that controls communication with the host device 2. For example, if the host interface circuit 21 receives a write request from the host device 2, it transfers a command and an address of the write request to the write control unit 22. Then, the host interface circuit 21 transfers user data to the buffer memory 25. If the host interface circuit 21 receives a read request from the host device 2, it transfers a command and an address of the read request to the read control unit 23. In addition, the host interface circuit 21 transfers user data from the buffer memory 25 to the host device 2 under the control of the read control unit 23.

The write control unit 22 controls a write operation in the nonvolatile memory 10. A plurality of write control units 22 may be provided to correspond to the number of memory units MU.

The write control unit 22 controls the error correction circuit 24 to generate write data using user data. The write data includes user data and an error correction code of the user data. The error correction code is used to perform an error check and correction (ECC) process for the user data. The write control unit 22 causes the write data to be stored in a write buffer 27.

The write control unit 22 controls the error correction circuit 24 to generate parity data of one page corresponding to write data of a plurality of pages (a plurality of write data items of respective pages). In the following descriptions, the unit of data to be written collectively in one write operation will be defined as "page." The parity data includes an erasure correction code and an error correction code of the erasure correction code. The erasure correction code is used to perform an erasure correction decoding process. The write control unit 22 causes parity data to be stored in the write buffer 27. In the following descriptions, a data group including write data of a plurality of pages and its corresponding parity data will be referred to as an "erasure correction data group."

The write control unit 22 operates in such a manner that write data of a plurality of pages and parity data of one page which are included in the erasure correction data group are distributed and written to a plurality of memory chips CP in the memory unit MU. More specifically, for example, if the erasure correction data group is configured with write data of three pages and parity data of one page, the write control unit 22 distributes and writes the write data of three pages and parity data of one page to four memory chips CP in the memory unit MU.

The write control unit 22 controls the schedule of a write operation to be performed in the memory unit MU. The write control unit 22 controls the number of write operations that can be performed in parallel in the memory unit MU. The write control unit 22 can control the number of erasure operations that can be performed in parallel in the memory unit MU. Note that "performed in parallel" includes a state in which operations are performed in duplicate with an arbitrary timing. The operations to be executed in parallel may be different from each other in the timing of start or end or in the length of the execution period.

The read control unit 23 controls a read operation in the nonvolatile memory 10. A plurality of read control units 23 may be provided to correspond to the number of memory units MU. The read data (including parity data) is stored in a read buffer 28.

The read control unit 23 performs either a normal read operation or a parity read operation based on the operating status of a read target memory chip CP that stores read target data. The normal read operation is an operation of reading read target data from a read target memory chip CP. The parity read operation is an operation of reading data (other data of the erasure correction data group) for use in an erasure correction decoding process of read target data from memory chips CP other than the read target memory chip CP in the memory unit MU. For example, if the read target data cannot be read immediately from the read target memory chip CP because a write operation is being performed, the normal read operation increases in its tail latency. In this case, the read control unit 23 selects a parity read operation.

The read control unit 23 controls the error correction circuit 24 to perform the ECC process for data (write data or parity data) read from the memory chip CP. The read control unit 23 causes the buffer memory 25 to store the user data that has been subjected to the ECC process or the erasure correction code.

The read control unit 23 controls the error correction circuit 24 to perform an erasure correction decoding process. More specifically, the read control unit 23 performs the ECC process for other data (including parity data) of the read erasure correction data group which has been read by the parity read operation. Then, the read control unit 23 executes the erasure correction decoding process using the user data and the erasure correction code that has been subjected to the ECC process. For example, in the erasure correction decoding process, an XOR operation is performed using other user data and the erasure correction code of the erasure correction data group to decode the read target data.

The error correction circuit 24 generates write data and parity data under the control of the write control unit 22. More specifically, the error correction circuit 24 generates an error correction code of the user data. The error correction circuit 24 imparts the error correction code to user data to generate write data. The error correction circuit 24 also generates an erasure correction code using a plurality of user data. The error correction circuit 24 imparts an error correction code to the erasure correction code to generate parity data.

In addition, the error correction circuit 24 performs the ECC process and the erasure correction decoding process under the control of the read control unit 23.

The buffer memory 25 is a volatile semiconductor memory. The buffer memory 25 temporarily stores data. The buffer memory 25 includes a write buffer 27 and a read buffer 28.

The write buffer 27 temporarily stores write data, parity data, and the like. A plurality of write buffers 27 may be provided to correspond to the number of write control units 22.

The read buffer 28 temporarily stores data or the like read from the nonvolatile memory 10. A plurality of read buffers 28 may be provided to correspond to the number of read control units 23.

The NAND interface circuit 26 is a hardware interface that controls communication between the memory controller 20 and the nonvolatile memory 10. In the example of FIG. 1, the NAND interface circuit 26 includes four channels CH0, CH1, CH2, and CH3. NAND buses NB0, NB1, NB2, and NB3 are coupled to the channels CH0, CH1, CH2, and CH3, respectively. For example, the NAND interface circuit 26 receives from the write control unit 22 a write instruction to the nonvolatile memory 10. The NAND interface circuit 26 transfers a control signal, a command, an address, and write data (or parity data) for a write operation to the nonvolatile memory 10 via a selected channel CH. For example, the NAND interface circuit 26 also receives from the read control unit 23 a read instruction to the nonvolatile memory 10. The NAND interface circuit 26 transmits a control signal, a command and an address for a read operation to the nonvolatile memory 10 via a selected channel CH. Then, the NAND interface circuit 26 transfers data read from the nonvolatile memory 10 to the read buffer 28.

1.1.3 Configuration of Memory Chip

An example of a configuration of a memory chip CP will be described with reference to FIG. 2. FIG. 2 is a block diagram showing a basic configuration of the memory chip CP. In the example of FIG. 2, some of the connections between blocks are shown by arrows. However, the connections are not limited to those shown by the arrows.

The memory chip CP includes a sequencer 101 and one or more domains DM. In the example of FIG. 2, the memory chip CP includes four domains DM0 to DM3. Note that the number of domains DM has only to be one or more.

The domains DM are each a management unit that manages the execution of a write operation, an erase operation and a read operation. The domains DM can operate independently of each other. The domains DM can also operate in parallel with each other. For example, the domains DM may be coupled to different drivers (power supplies).

Each of the domains DM includes a plurality of planes PLN. In the example of FIG. 2, the domain DM includes two planes PLN0 and PLN1. Note that the number of planes PLN is not limited to two. The number of planes PLN may be three or more. The planes PLN are each a unit for performing the write operation, the read operation, and the erase operation. The planes PLN0 and PLN1 can operate independently of each other. The planes PLN0 and PLN1 can operate the write operations, or the erase operation and the read operation in parallel. However, the planes PLN0 and PLN1 cannot perform their read operations in parallel with each other. In addition, the planes PLN0 and PLN1 cannot perform the write operations or the erase operations in parallel with each other.

More specifically, for example, during the write operation or the erase operation in the plane PLN0, the read operation can be executed in the plane PLN1 in parallel with the plane PLN0. However, for example, during the read operation in the plane PLN0, no read operation can be executed in the plane PLN1. For example, during the write operation or the erase operation in the plane PLN0, neither the write operation nor the erase operation can be executed in the plane PLN1.

The sequencer 101 controls the operation of the entire memory chip CP. More specifically, the sequencer 101 controls the write operation, the read operation, and the erase operation in each of the domains DM.

Next is a description of the internal configuration of the planes PLN0 and PLN1. In the description, the planes PLN0 and PLN1 have the same configuration. Note that the planes PLN0 and PLN1 may have different configurations.

The plane PLN0 includes a memory cell array 102*a*, a row decoder 103*a*, and a sense amplifier 104*a*. Similarly, the plane PLN1 includes a memory cell array 102*b*, a row decoder 103*b*, and a sense amplifier 104*b*. Since the planes PLN0 and PLN1 do not simultaneously perform the read operation, the write operation, the erase operation, and the like, some of the circuits used for these operations may be shared. If the memory cell arrays 102*a* and 102*b* need not be distinguished from each other, they will be simply referred to as "memory cell array 102." If the row decoders 103*a* and 103*b* need not be distinguished from each other, they will be simply referred to as "row decoder 103." If the sense amplifiers 104*a* and 104*b* need not be distinguished from each other, they will be simply referred to as "sense amplifier 104."

The memory cell array 102 is a set of memory cell transistors that are arrayed. The memory cell array 102 includes a plurality of blocks BLK (BLK0, BLK1, . . . ). Note that the number of blocks BLK in the memory cell array 102 is arbitrary. Each of the blocks BLK is, for example, a set of memory cell transistors from which data are collectively erased. That is, each of the blocks BLK is a unit of data erasure. The details of the configuration of the blocks BLK will be described later.

The row decoder 103 is a decoding circuit for decoding a row address. The row address is address information received from the memory controller 20. The row decoder 103 selects a block BLK in the memory cell array 102 based on a decoding result. The row decoder 103 applies voltages to the lines (word line and select gate line to be described later) in the row direction of the selected block BLK.

The sense amplifier 104 is a read and write circuit. The sense amplifier 104 reads data from the memory cell array 102 during the read operation. In addition, the sense amplifier 104 applies voltages corresponding to write data to the memory cell array 102 during the write operation.

1.1.4 Configuration of Memory Cell Array Circuit

An example of the circuit configuration of the memory cell array 102 will be described below with reference to FIG. 3. FIG. 3 is a circuit diagram of the memory cell array 102. The example of FIG. 3 is directed to the circuit configuration of one block BLK.

The block BLK includes four string units SU0 to SU3, for example. Note that the number of string units SU included in the block BLK is arbitrary. Each of the string units SU is, for example, a set of NAND strings NS selected collectively in the write operation or the read operation.

Each of the string units SU includes a plurality of NAND strings NS. Each of the NAND strings NS is a set of memory cell transistors coupled in series. Each of the NAND strings NS in the string unit SU is coupled to one of the bit lines BL0 to BLn (n is an integer larger than or equal to 1).

Each of the NAND strings NS includes a plurality of memory cell transistors MC and select transistors ST1 and ST2. In the example of FIG. 3, each NAND string NS includes eight memory cell transistors MC0 to MC7.

The memory cell transistor MC is a memory element that stores data in a nonvolatile manner. The memory cell transistors MC each include a control gate and a charge storage layer. The memory cell transistors MC may be a metal-oxide-nitride-oxide-silicon (MONOS) type or a floating gate (FG) type. In the MONOS type, an insulating layer is used for the charge storage layer. In the FG type, a conductor layer is used for the charge storage layer.

The select transistors ST1 and ST2 are switching elements. The select transistors ST1 and ST2 are each used to select a string unit SU in a variety of operations.

The current paths of the select transistor ST2, the memory cell transistors MC0 to MC7, and the select transistor ST1 in each NAND string NS are coupled in series. The drain of the select transistor ST1 is coupled to the bit line BL. The source of the select transistor ST2 is coupled to the source line SL.

The control gates of the memory cell transistors MC0 to MC7 in the same block BLK are coupled to word lines WL0 to WL7, respectively. More specifically, for example, the block BLK includes four string units SU0 to SU3. Each string unit SU includes a plurality of memory cell transistors MC0. The control gates of the memory cell transistors MC0 in the block BLK are coupled in common to one word line WL0. The same applies to the memory cell transistors MC1 to MC7.

The gates of the select transistors ST1 in each of the string units SU are coupled in common to one select gate line SGD. More specifically, the gates of the select transistors ST1 in the string unit SU0 are coupled in common to a select gate line SGD0. The gates of the select transistors ST1 in the string unit SU1 are coupled in common to a select gate line SGD1. The gates of the select transistors ST1 in the string unit SU2 are coupled in common to a select gate line SGD2. The gates of the select transistors ST1 in the string unit SU3 are coupled in common to a select gate line SGD3.

The gates of the select transistors ST2 in the block BLK are coupled in common to a select gate line SGS. Like the select gate lines SGD, different select gate lines SGS may be provided for their respective string units SU.

The word lines WL0 to WL7, the select gate lines SGD0 to SGD3, and the select gate line SGS are coupled to the row decoder 103 in the plane PLN.

Each bit line BL is coupled in common to one NAND string NS in each string unit SU in each block BLK. The same column address is assigned to a plurality of NAND strings NS coupled to one bit line BL. Each bit line BL is coupled to the sense amplifier 104 in the plane PLN.

The source line SL is shared among a plurality of blocks BLK, for example.

A set of memory cell transistors MC coupled to a common word line WL in one string unit SU will be referred to as, for example, "cell unit CU." If a memory cell transistor MC stores, for example, 1-bit data, the storage capacity of the cell unit CU is defined as "1 page." The cell unit CU may have a storage capacity of two or more pages based on the number of bits of data stored in the memory cell transistor MC.

1.1.5 Configuration of Memory Area of Memory Chip

An example of the configuration of the memory area of a memory chip CP will be described below with reference to FIG. 4. FIG. 4 is a diagram showing a configuration of the memory area of a memory chip CP. In the following descriptions, if the planes PLN0 and PLN1 and the memory cell arrays 102*a* and 102*b* in the domain DM0 are described, they will be referred to as planes PLN0_0 and PLN1_0 and memory cell arrays 102*a*_0 and 102*b*_0. If the planes PLN0 and PLN1 and the memory cell arrays 102*a* and 102*b* in the domain DM1 are described, they will be referred to as planes PLN0_1 and PLN1_1 and memory cell arrays 102*a*_1 and 102*b*_1. If the planes PLN0 and PLN1 and the memory cell arrays 102*a* and 102*b* in the domain DM2 are described, they will be referred to as planes PLN0_2 and PLN1_2 and memory cell arrays 102*a*_2 and 102*b*_2. If the planes PLN0 and PLN1 and the memory cell arrays 102*a* and 102*b* in the domain DM3 are described, they will be referred to as planes PLN0_3 and PLN1_3 and memory cell arrays 102*a*_3 and 102*b*_3.

As shown in FIG. 4, the memory area of the memory chip CP includes a plurality of plane units PU each including memory cell arrays 102 each included in one plane PLN of each domain DM. The plane units PU are memory areas that are controlled independently of each other. The number of plane units PU is arbitrary and corresponds to the number of planes PLN included in each domain DM. In the example of FIG. 4, the memory chip CP includes two plane units PU0 and PU1. The plane unit PU0 includes memory cell arrays 102*a* each included in the plane PLN0 of each domain DM. More specifically, the plane unit PU0 includes memory cell arrays 102*a*_0, 102*a*_1, 102*a*_2, and 102*a*_3. Similarly, the plane unit PU1 includes memory cell arrays 102*b* each included in the plane PLN1 of each domain DM. More specifically, the plane unit PU1 includes memory cell arrays 102*b*_0, 102*b*_1, 102*b*_2, and 102*b*_3.

1.1.6 Specific Example of Operation in Memory Chip

Figure 5:
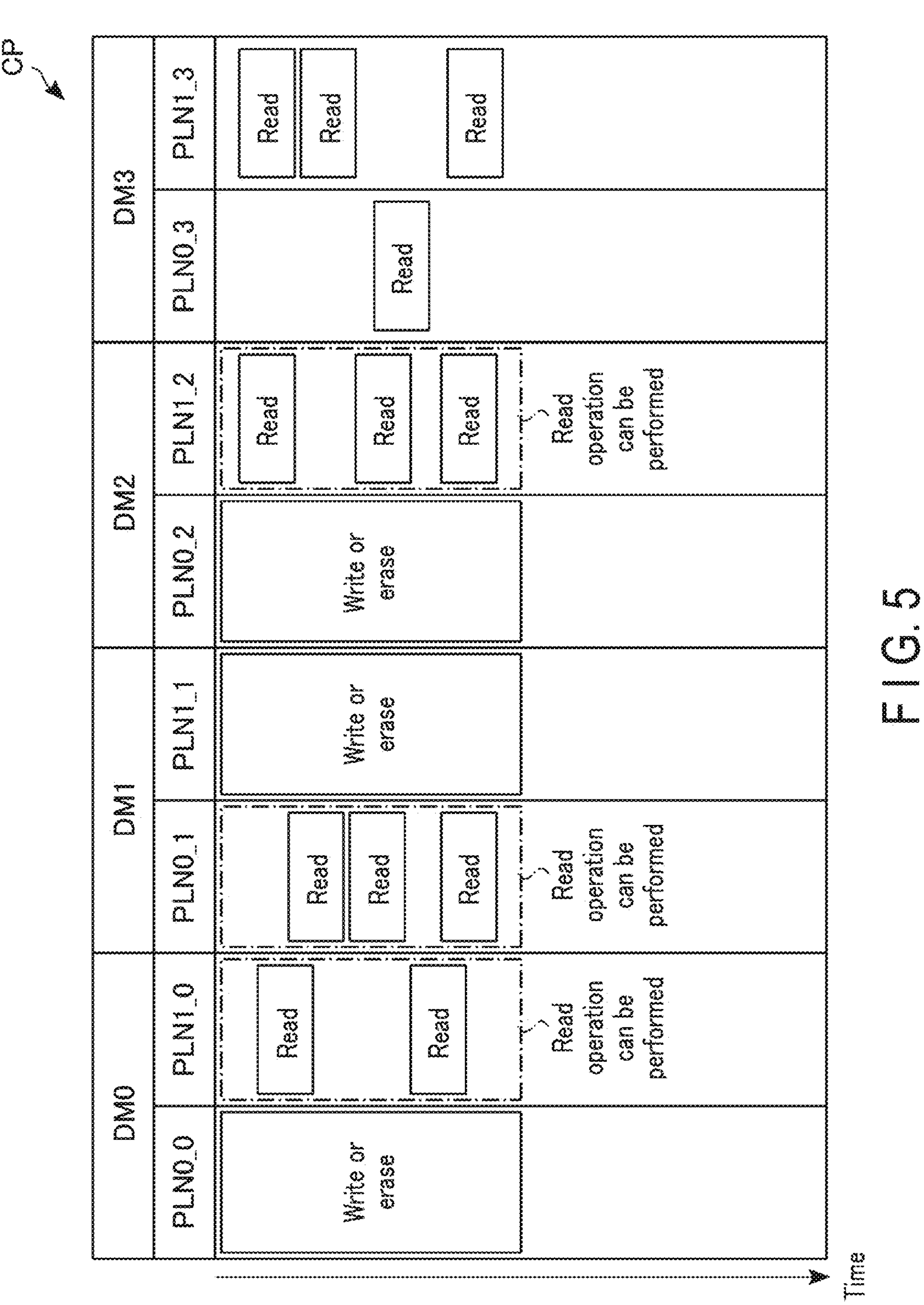
FIG. 5 is a diagram showing a specific example of an operation in the memory chip included in the memory system according to the first embodiment.

A specific example of an operation in the memory chip CP will be described below with reference to FIG. 5. FIG. 5 is a diagram showing a specific example of an operation in the memory chip CP.

As shown in FIG. 5, the sequencer 101 can perform the write operations or the erase operations in parallel in one of the planes PLN of each of the domains DM. In the example of FIG. 5, the write operations or the erase operations are performed in parallel in planes PLN0_0, PLN1_1 and PLN0_2. During this time period, the write operation or the erase operation cannot be performed in plane PLN1_0 of the same domain DM0 as the plane PLN0_0, plane PLN0_1 of the same domain DM1 as the plane PLN1_1, or plane PLN1_2 of the same domain DM2 as the plane PLN0_2. In the planes PLN1_0, PLN0_1 and PLN1_2, the read operation can be performed. The latency of the read operation is shorter than that of each of the write operation and the erase operation. Thus, two read operations are performed in the plane PLN1_0, for example. Three read operations are performed in the planes PLN0_1 and PLN1_2, for example.

Neither the write operation nor the erase operation is performed in the domain DM3. In this case, the read operation can be performed in one of the planes PLN0_3 and PLN1_3. Three read operations are performed in the plane PLN1_3, for example. Since no read operations can be performed in parallel in the domain DM, one read operation is performed in the plane PLN0_3 while no read operation is performed in the plane PLN1_3.

1.1.7 Configuration of Memory Area of Memory Unit

An example of the configuration of the memory area of the memory unit MU will be described below with reference to FIG. 6. FIG. 6 is a diagram showing a configuration of the memory area of the memory unit MU. The example of FIG. 6 is directed to the configuration of the memory area of the memory unit MU0.

As shown in FIG. 6, a stream STM0 is configured by the plane units PU0 of the memory chips CP0_0, CP1_0, CP2_0, and CP3_0, and a stream STM1 is configured by the plane units PU1 of the memory chips CP0_0, CP1_0, CP2_0, and CP3_0. Note that the number of streams STM included in the memory unit MU is arbitrary. For example, the number of streams STM corresponds to the number of plane units PU of the memory chips CP. The stream STM is not limited to those shown in FIG. 6. For example, one stream STM may be configured by one plane PLN of one domain DM of one plane unit PU of each memory chip CP. For example, the stream STM0 may be configured by the planes PLN0 of the domains DM0 of the plane units PU0 of the memory chips CP0_0, CP1_0, CP2_0, and CP3_0.

For example, the stream STM is a set of plane units PU corresponding to an erasure correction data group. For example, one-page parity data and three-page write data included in the erasure correction data group are distributed and written to four plane units PU of the stream STM0. If the write operation or the erase operation is being performed in one plane unit PU in the stream STM, for example, the write operation and the erase operation in the other plane units PU are restricted such that data in the one plane unit PU can be subjected to the erasure correction decoding process. In the stream STM, therefore, the number of plane units PU capable of performing the write operation or the erase operation is limited to, for example, one. In other words, within one stream STM, the write operations or the erase operations cannot be performed in parallel in a plurality of plane units PU. Note that the read operations can be performed in parallel in a plurality of plane units PU in the stream STM.

1.1.8 Specific Example of Operation in Memory Unit

A specific example of an operation in the memory unit MU will be described below with reference to FIG. 7. FIG. 7 is a diagram showing a specific example of an operation in the memory unit MU.

As shown in FIG. 7, for example, the write operation or the erase operation is being performed in the plane unit PU0 of the memory chip CP0_0 included in the stream STM0, for example. More specifically, the write operation or the erase operation is being performed in the plane PLN0 of at least one domain DM of the memory chip CP0_0. If the plane unit PU0 includes, for example, four domains DM0 to DM3, four write operations corresponding to four erasure correction data groups may be performed in parallel in their respective planes PLN0 (PLN0_0, PLN0_1, PLN0_2, and PLN0_3).

In this situation, in the plane units PU0 of the other memory chips CP1_0, CP2_0, and CP3_0 included in the stream STM0, the read operation can be performed, but neither the write operation nor the erase operation can be performed.

The read operation can be performed in the plane unit PU1 of the memory chip CP0_0 included in the stream STM1. The write operation or the erase operation corresponding to the stream STM1 can be performed in a domain DM other than the domain DM in which the write operation or the erase operation corresponding to the stream STM0 is performed. More specifically, if the write operation or the erase operation is performed, for example, in the plane PLN0 of the domain DM0 of the memory chip CP1_0, neither the write operation nor the erase operation can be performed in the plane PLN1 of the domain DM0. In the plane PLN1 of each of the domains DM1 to DM3, the write operation or the erase operation can be performed. If the write operations corresponding to the four erasure correction data groups are performed in parallel in the planes PLN0 of the domains DM0 to DM3 of the memory chip CP1_0, neither the write operation nor the erase operation can be performed in the plane units PU1 of the memory chip CP1_0.

In the plane units PU1 of the other memory chips CP1_0, CP2_0 and CP3_0 included in the stream STM1, the read operation, the write operation, and the erase operation can be performed.

Therefore, two write operations in different memory chips CP can be performed in parallel in one memory unit MU corresponding to the erasure correction data group.

1.1.9 Configuration of Write Control Unit

An example of the configuration of the write control unit 22 will be described below with reference to FIG. 8. FIG. 8 is a block diagram showing the configuration of the write control unit 22.

As shown in FIG. 8, the write control unit 22 includes a plurality of stream control units 221 and a write monitoring unit 222. In the example of FIG. 8, the write control unit 22 includes a stream 0 control unit 221*a* corresponding to the stream STM0 and a stream 1 control unit 221*b* corresponding to the stream STM1. Note that the number of stream control units 221 included in the write control unit 22 is arbitrary. The number of stream control units 221 corresponds to the number of streams STM included in the memory unit MU.

The stream 0 control unit 221*a* is a control circuit that controls the write operation in the stream STM0. Upon receiving a signal from the write monitoring unit 222, the stream 0 control unit 221*a* controls the schedule of the write operation in each plane unit PU0 in the stream STM0.

The stream 1 control unit 221*b* is a control circuit that controls the write operation in the stream STM1. Upon receiving a signal from the write monitoring unit 222, the stream 1 control unit 221*b* controls the schedule of the write operation in each plane unit PU1 in the stream STM1.

The write monitoring unit 222 monitors the write operation or the erase operation which is being performed in the memory unit MU. The write monitoring unit 222 estimates a time at which the write operation or the erase operation is completed and transmits the estimated time to the stream 0 control unit 221*a* and the stream 1 control unit 221*b*.

1.1.10 Configuration of Read Control Unit

An example of the configuration of the read control unit 23 will be described below with reference to FIG. 9. FIG. 9 is a block diagram showing the configuration of the read control unit 23.

As shown in FIG. 9, the read control unit 23 includes a parity decoding determination circuit 231.

The parity decoding determination circuit 231 determines whether to perform the erasure correction decoding process on data to be read. Upon receiving a read request from the host device 2, the parity decoding determination circuit 231 confirms the operation status of a target memory unit MU to determine whether to perform the parity read operation. If the parity decoding determination circuit 231 determines that the erasure correction decoding process is not performed, the read control unit 23 instructs a memory chip CP having data to be read to perform the normal read operation. If the parity decoding determination circuit 231 determines that the erasure correction decoding process is performed, the read control unit 23 instructs the other memory chips CP of the memory unit MU to perform the read operations of other data of the erasure correction data group including data to be read.

1.1.11 Configuring Write Buffer

An example of the configuration of the write buffer 27 will be described with reference to FIG. 10. FIG. 10 is a block diagram showing the configuration of the write buffer 27.

As shown in FIG. 10, the write buffer 27 includes a plurality of stream buffers 271. In the example of FIG. 10, the write buffer 27 includes a stream 0 buffer 271*a* corresponding to the stream STM0 and a stream 1 buffer 271*b* corresponding to the stream STM1. Note that the number of stream buffers 271 included in the write buffer 27 is arbitrary. The number of stream buffers 271 may correspond to the number of stream control units 221 included in the write control unit 22. Note that, for example, the stream buffer 271 is not released until the write operation of the corresponding stream STM is completed. Therefore, the write buffer 27 may include an extra buffer for temporarily storing new write data while each stream buffer 271 is not released.

The stream 0 buffer 271*a* includes a data buffer 272*a* and a parity buffer 273*a*. The data buffer 272*a* temporarily stores the write data corresponding to the stream STM0. The parity buffer 273*a* temporarily stores parity data corresponding to the write data stored in the data buffer 272*a*.

The stream 1 buffer 271*b* includes a data buffer 272*b* and a parity buffer 273*b*. The data buffer 272*b* temporarily stores write data corresponding to the stream STM1. The parity buffer 273*b* temporarily stores parity data corresponding to the write data stored in the data buffer 272*b*.

If the data buffers 272*a* and 272*b* need not be distinguished from each other, they will be simply referred to as "data buffer 272" hereinafter. If the parity buffers 273*a* and 273*b* need not be distinguished from each other, they will be simply referred to as "parity buffer 273."

1.2 Write Operation

1.2.1 Flow of Write Operation

Figure 11:
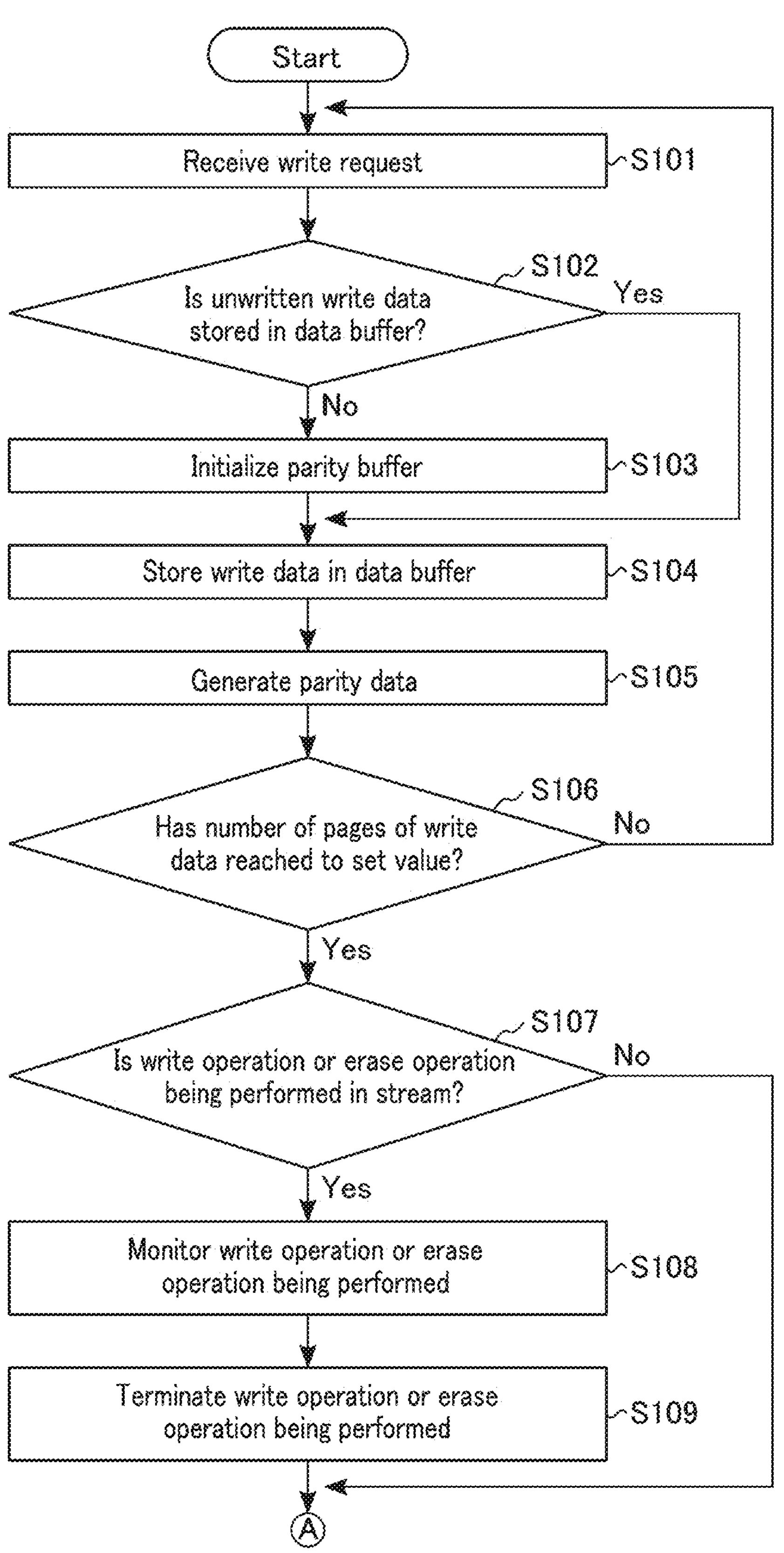
FIG. 11 is a flowchart of a write operation in the memory system according to the first embodiment.
Figure 12:
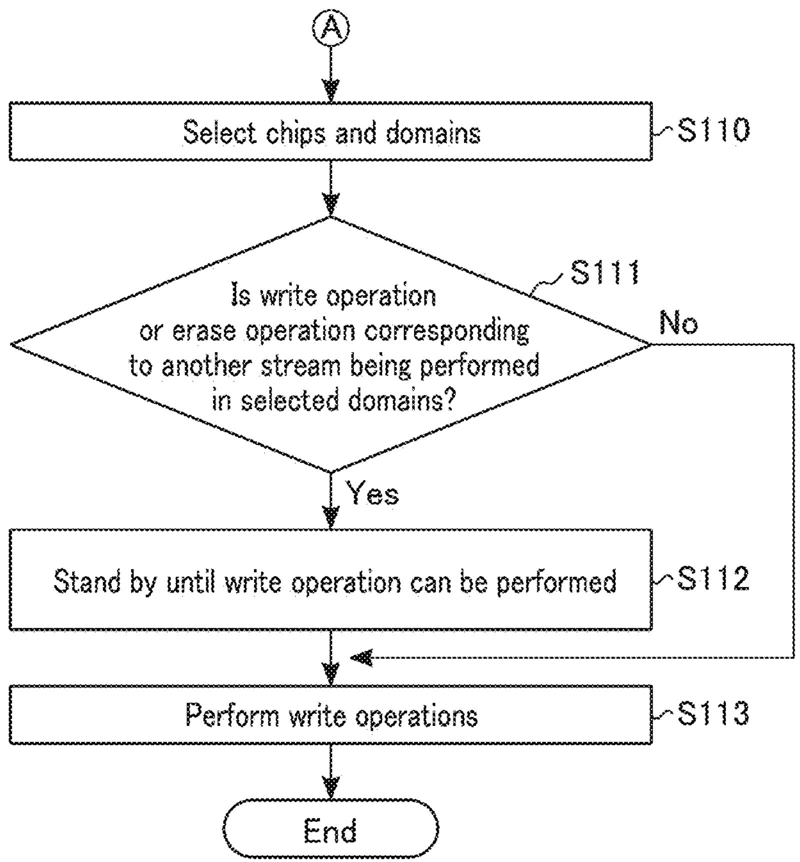
FIG. 12 is a flowchart of the write operation in the memory system according to the first embodiment.

An example of a flow of the write operation will be described below with reference to FIGS. 11 and 12. FIGS. 11 and 12 are a flow chart of the write operation. The following description is directed to a write operation to be performed by selecting a stream STM0 of the memory unit MU0. The same applies to the write operation to be performed by selecting another memory unit MU or another stream STM. For simplicity of description, hereinafter, it is assumed that the write operation corresponding to one erasure correction data group is performed.

As shown in FIG. 11, first, the memory controller 20 receives a write request from the host device 2 (S101). Upon receiving a write request (user data), the write control unit 22 controls the error correction circuit 24 to generate write data.

The write control unit 22 refers to the data buffer 272 of each stream buffer 271 to confirm whether unwritten write data which is not written in the nonvolatile memory 10 is stored (S102). More specifically, the write control unit 22 refers to the data buffer 272*a* of the stream 0 buffer 271*a* and the data buffer 272*b* of the stream 1 buffer 271*b* to confirm whether unwritten write data is stored.

If there is no unwritten write data (No in S102), the write control unit 22 selects one of the streams STM. If the write controller 22 selects, for example, the stream STM0, the stream 0 control unit 221*a* initializes the parity buffer 273*a* (S103).

If there is unwritten write data (Yes in S102), the write control unit 22 selects a stream STM corresponding to the data buffer 272 in which unwritten write data is stored. If unwritten write data is stored in, for example, the data buffer 272*a* of the stream 0 buffer 271*a*, the write control unit 22 selects the stream STM0.

After the initialization of the parity buffer 273*a* in S103 or if there is unwritten write data in the data buffer 272*a* (Yes in S102), the stream 0 control unit 221*a* causes the generated write data to be stored (temporarily stored) in the data buffer 272*a* (S104).

The stream 0 control unit 221*a* controls the error correction circuit 24 to generate parity data using the write data stored in the data buffer 272*a* (S105). The parity data is stored in the parity buffer 273*a*.

The stream 0 control unit 221*a* confirms whether the number of pages of write data stored in the data buffer 272*a* has reached a set value (S106). If the erasure correction data group includes, for example, write data of three pages and parity data of one page, the set value is set to 3. In this case, the stream 0 control unit 221*a* confirms whether write data of three pages is stored in the data buffer 272*a*. The first embodiment is not limited to the foregoing case of confirming whether the number of pages of write data stored in the data buffer 272*a* has reached the set value. For example, the write data may be used to generate the parity data and then be written to a target memory chip CP at any time. In this case, the write data written to the memory chip CP need not be stored in the data buffer 272*a*. The stream 0 control unit 221*a* confirms whether the number of pages of the write data used to generate the parity data has reached the set value.

If the number of pages of write data does not reach the set value (No in S106), the stream 0 control unit 221*a* repeats the loop of S101 to S106 until the number of pages of write data reaches the set value.

If the number of pages of write data has reached the set value (Yes in S106), the stream 0 control unit 221*a* confirms whether the write operation or the erase operation is being performed in the stream STM0 (S107).

If the write operation or the erase operation is being performed in the stream STM0 (Yes in S107), the write monitoring unit 222 monitors the write operation or the erase operation being performed (S108). The write monitoring unit 222 estimates a time at which the write operation or the erase operation is completed and notifies the stream 0 control unit 221*a*. The stream 0 control unit 221*a* sets the write operation of data (the write data and the parity data) in the stream 0 buffer 271*a* in a standby state until the completion time is reached.

The write operation or erase operation is terminated (S109).

As shown in FIG. 12, after the write operation or the erase operation is terminated in S109, or if neither the write operation nor the erase operation is being performed in the stream STM0 (No in S107), the stream 0 control unit 221*a* selects memory chips CP to which data is written and domains DM (S110). More specifically, for example, the stream 0 control unit 221*a* selects the plane PLN0 of domain DM0 of each of the memory chips CP0_0, CP1_0, CP2_0 and CP3_0.

The stream 0 control unit 221*a* confirms whether the write operation or the erase operation corresponding to another stream STM1 is being performed in the selected domains DM (S111). That is, the stream 0 control unit 221*a* confirms whether the write operations or the erase operations collide (overlap) with each other in the same domain DM. When the stream 0 control unit 221*a* selects, for example, the plane PLN0 of the domain DM0 of the memory chip CP0_0, the stream 0 control unit 221*a* confirms that the write operation or the erase operation corresponding to the stream STM1 is being performed in the plane PLN1 of the same domain DM0.

If the write operation or the erase operation is being performed in the same domain DM (Yes in S111), the stream 0 control unit 221*a* stands by until the write operation can be performed (S112). For example, the write monitoring unit 222 estimates a time at which the write operation or the erase operation is completed and notifies the stream 0 control unit 221*a*. The stream 0 control unit 221*a* is placed in a standby state until the completion time of the write operation or the erase operation being executed is reached.

After the standby in S112 or if neither the write operation nor the erase operation is being performed (No in S111), the stream 0 control unit 221*a* performs the write operations. For example, the stream 0 control unit 221*a* performs four write operations corresponding to the write data of three pages and the parity data of one page at different timings so that a plurality of write operations are not performed in parallel (not overlapped) in each plane unit PU of the stream STM0.

1.2.2 Specific Example of Write Operation

Figure 13:
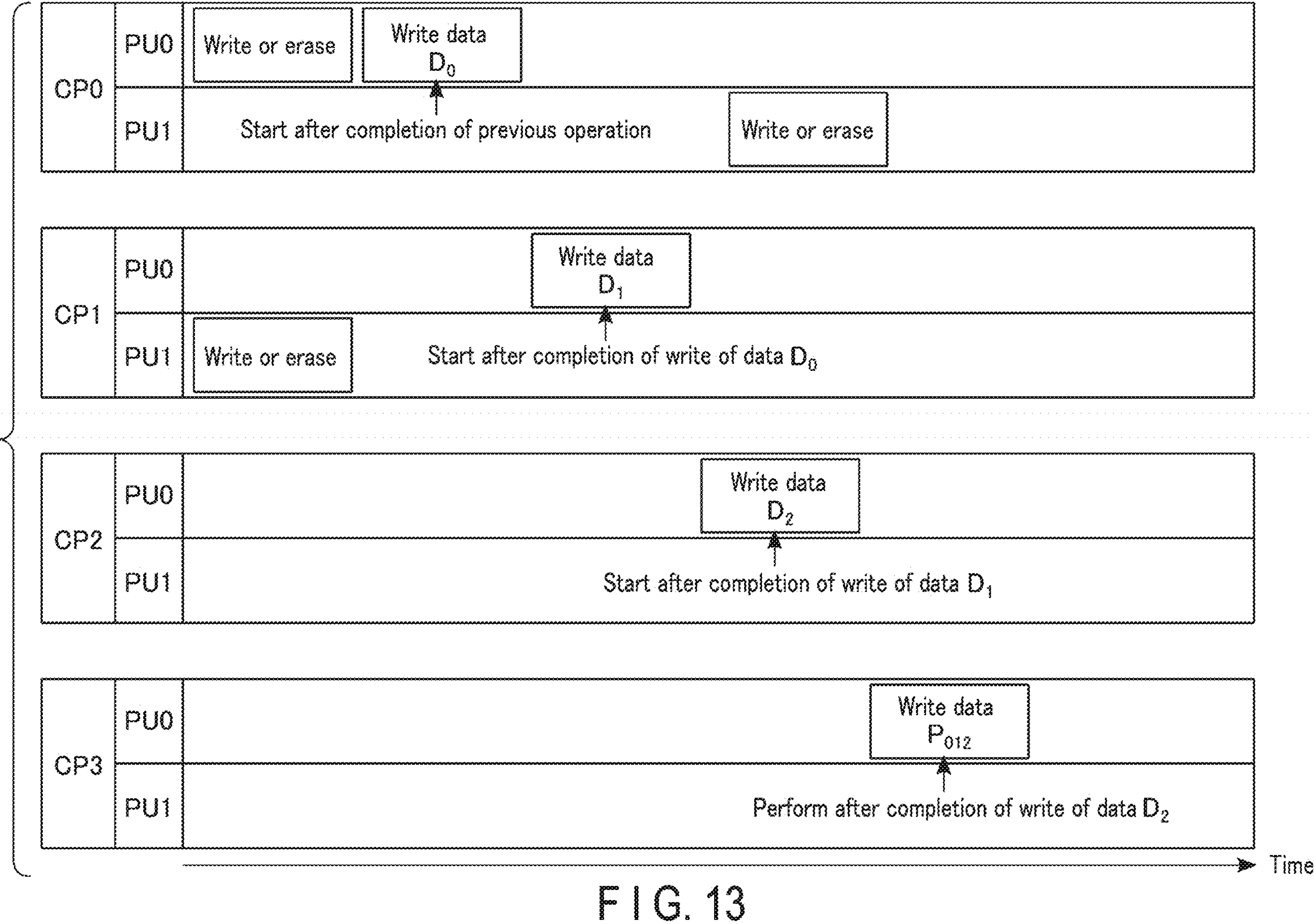
FIG. 13 is a diagram showing a specific example of the write operation in the memory system according to the first embodiment.

A specific example of the write operation will be described below with reference to FIG. 13. FIG. 13 is a diagram showing a specific example of the write operation. The following description will focus on a write operation corresponding to the stream STM0.

As shown in FIG. 13, the write operation or the erase operation is being performed in, for example, the plane unit PU0 of the memory chip CP0 and the plane unit PU1 of the memory chip CP1. Since the plane unit PU0 of the memory chip CP0 and the plane unit PU1 of the memory chip CP1 are different streams STM of different memory chips CP, the write operations or the erase operations can be performed in parallel.

In this state, for example, the stream 0 control unit 221*a* performs write operations of write data $D_0$, $D_1$, and $D_2$ and parity data $P_{012}$. The parity data $P_{012}$ corresponds to the erasure correction decoding processing of the write data $D_0$, $D_1$, and $D_2$. That is, the write data $D_0$, $D_1$, and $D_2$ and the parity data $P_{012}$ form an erasure correction data group.

First, after completion of the write operation or the erase operation of the plane unit PU0 of the memory chip CP0, the stream 0 control unit 221*a* performs the write operation of the write data $D_0$ in the plane unit PU0 of the memory chip CP0. During this time period, the write operation or the erase operation can be performed in, for example, the plane unit PU1 of one of the memory chips CP1 to CP3 corresponding to the stream STM1. In the example of FIG. 13, the write operation or the erase operation is performed in the plane unit PU1 of the memory chip CP2.

Then, after completion of the write operation of the write data $D_0$ in the plane unit PU0 of the memory chip CP0, the stream 0 control unit 221*a* performs the write operation of the write data $D_1$ in the plane unit PU0 of the memory chip CP1. During this time period, the write operation or the erase operation can be performed in, for example, the plane unit PU1 of one of the memory chips CP0, CP2 and CP3 corresponding to the stream STM1. In the example shown in FIG. 13, the write operation or the erase operation is performed in the plane unit PU1 of the memory chip CP3.

Then, after completion of the write operation of the write data $D_1$ in the plane unit PU0 of the memory chip CP1, the stream 0 control unit 221*a* performs the write operation of the write data $D_2$ in the plane unit PU0 of the memory chip CP2. During this time period, the write operation or the erase operation can be performed in, for example, the plane unit PU1 of one of the memory chips CP0, CP1, and CP3_corresponding to the stream STM1.

Then, after completion of the write operation of the write data $D_2$ in the plane unit PU0 of the memory chip CP2, the stream 0 control unit 221*a* performs the write operation of the parity data $P_{012}$ in the plane unit PU0 of the memory chip CP3. During this time period, the write operation or the erase operation can be performed in, for example, the plane unit PU1 of one of the memory chips CP0 to CP2 corresponding to the stream STM1. In the example of FIG. 13, the write operation or the erase operation is performed in the plane unit PU1 of the memory chip CP0. Note that the order in which the write operations of the data $D_0$, $D_1$ and $D_2$ and the parity data $P_{012}$ are performed can be arbitrarily set.

1.3 Read Operation

1.3.1 Flow of Read Operation

An example of a flow of the read operation will be described below with reference to FIG. 14. FIG. 14 is a flowchart of the read operation. For the simplicity of the description, hereinafter, it is assumed that a read operation corresponding to one erasure correction data group is performed.

As shown in FIG. 14, first, the memory controller 20 receives a read request from the host device 2 (S201).

The read control unit 23 confirms whether the write operation or the erase operation is being performed in a target plane PLN of a target memory chip CP in which read target data is stored (S202).

If the write operation or the erase operation is being performed (Yes in S202), the read control unit 23 confirms whether parity data corresponding to the read target data is stored in the read buffer 28 or another memory chip CP (S203).

If the parity data is stored (Yes in S203), the read control unit 23 performs the parity read operation (S204). The read control unit 23 can perform the read operations of other data (including parity data) of the erasure correction data group including the read target data in parallel.

The read control unit 23 controls the error correction circuit 24 to perform the erasure correction decoding process using the read data and then decode the read target data (S205).

If neither the write operation nor the erase operation is being performed (No in S202) or if no parity data is stored (No in S203), the read control unit 23 performs the normal read operation of the read target data in the target plane PLN (S206).

1.3.2 Specific Example of Read Operation

Figure 15:
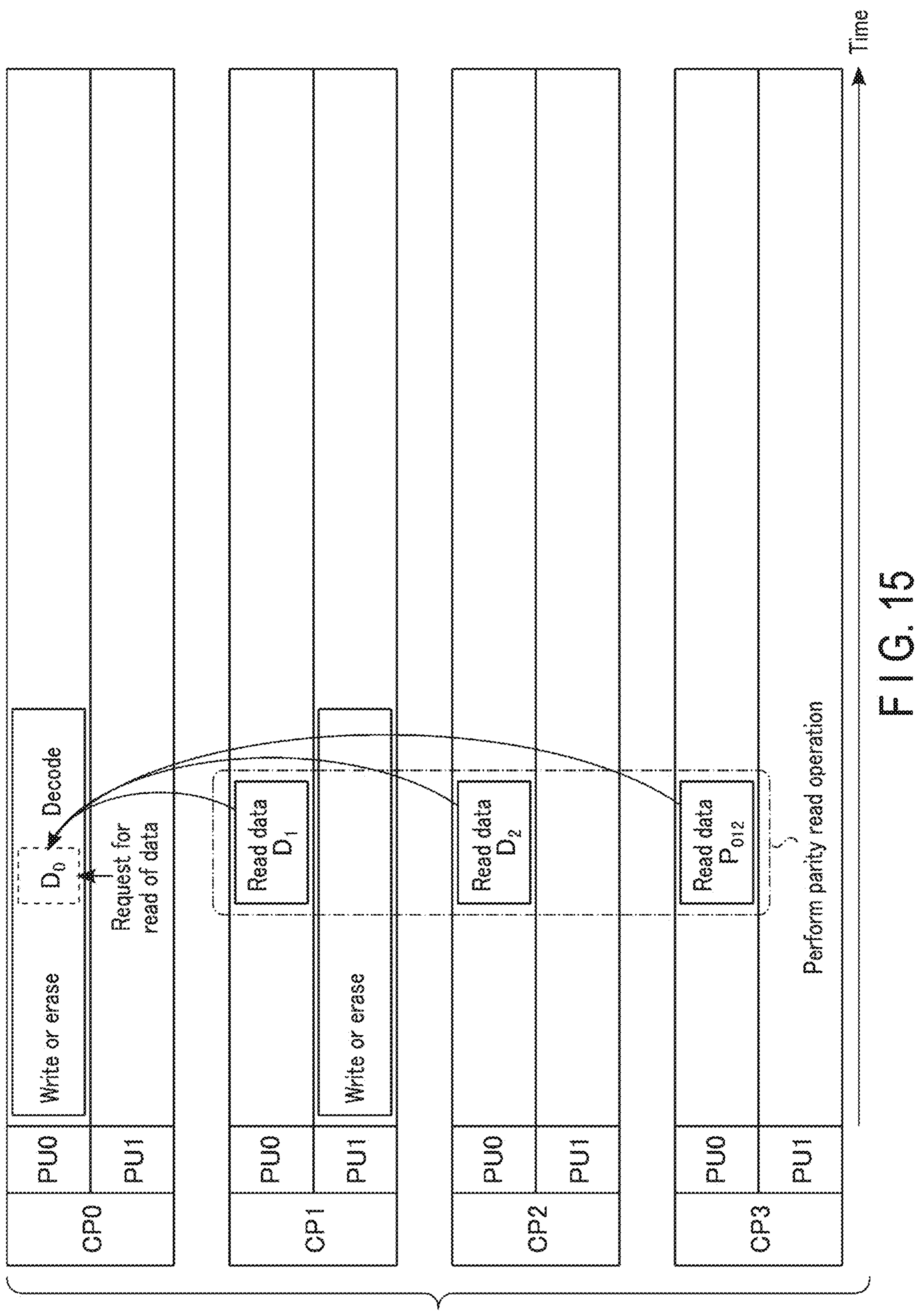
FIG. 15 is a diagram showing a specific example of the read operation in the memory system according to the first embodiment.

A specific example of a write operation will be described with reference to FIG. 15. FIG. 15 is a diagram showing a specific example of the read operation. In the example of FIG. 15, the parity read operation is performed.

As shown in FIG. 15, the write operation or the erase operation is being performed in, for example, each of the plane unit PU0 of the memory chip CP0 and the plane unit PU1 of the memory chip CP1.

In this state, upon receiving a read request of data $D_0$ of the plane unit PU0 of the memory chip CP0, for example, the read control unit 23 selects the parity read operation. For example, the read control unit 23 performs a read operation of data $D_1$ of the plane unit PU0 of the memory chip CP1, a read operation of data $D_2$ of the plane unit PU0 of the memory chip CP2, and a read operation of parity data $P_{012}$ of the plane unit PU0 of the memory chip CP3 in parallel. Then, the read control unit 23 controls the error correction circuit 24 to perform the erasure correction decoding process using the data $D_1$, data $D_2$, and the parity data $P_{012}$. Thus, the data $D_0$ is decoded.

1.4 Advantages of First Embodiment

The configuration according to the first embodiment makes it possible to improve the processing capability of the memory system 3. This advantage will be described in detail.

For example, a write request and a read request for the same memory area of a memory chip may collide (overlap) with each other. If the write operation is already being performed in the memory area, the read operation is brought into a standby state and thus the tail latency of the read operation increases. As one method of suppressing the tail latency of the read operation from increasing, there is a method of decoding read target data using an erasure correction decoding process. For example, if no read target data can be read due to the operation that is being performed, the read target data can be decoded using data (including an erasure correction code) read from the other memory chips to suppress the tail latency of the read operation from increasing. However, the number of memory chips that can perform write operations in parallel for a plurality of memory chips corresponding to an erasure correction data group is limited to one, for example. Thus, a write performance is decreased.

With the configuration according to the first embodiment, a plurality of plane units PU can be provided in a memory chip CP. For example, even if a write operation or an erase operation is being performed in one plane unit PU, read operations can be performed in the other plane units PU. A stream STM corresponding to an erasure correction data group can be configured by plane units PU of each of the memory chips CP. Thus, for example, a plurality of write operations can be performed in parallel in accordance with the number of streams STM for a plurality of memory chips corresponding to the erasure correction data group. Therefore, the memory system 3 can be improved in its write performance and thus improved in its processing capability.

1.5 Modification of First Embodiment

Next is a description of three modifications of the first embodiment. Hereinafter, the description will focus on differences from the first embodiment.

1.5.1 First Modification of First Embodiment

Figure 16:
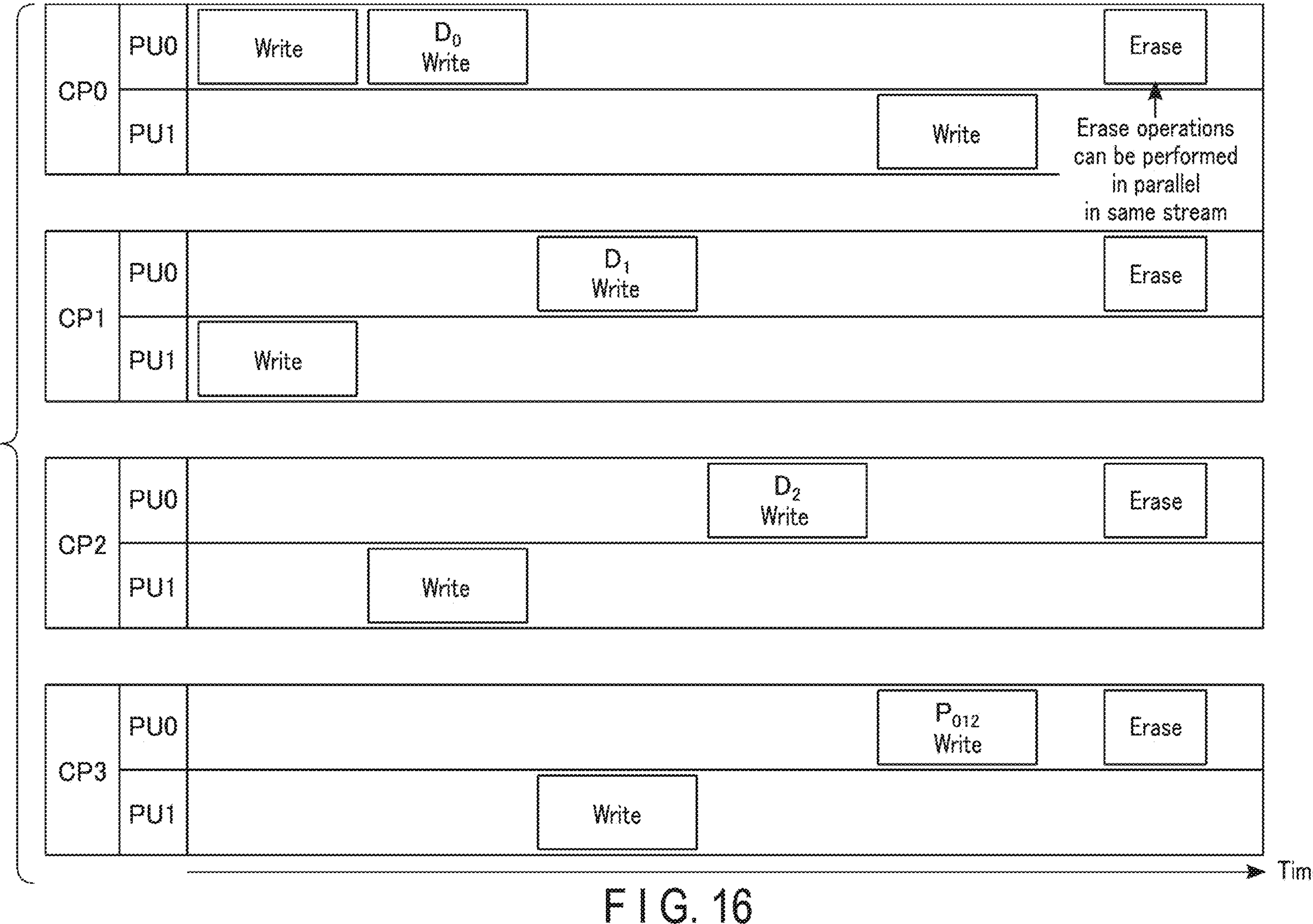
FIG. 16 is a diagram showing a specific example of the read operation in a memory system according to a first modification of the first embodiment.

First is a description of a first modification of the first embodiment. In the first modification, erase operations are performed in parallel in a plurality of plane units PU in the same stream STM. FIG. 16 is a diagram showing a specific example of a write operation.

As shown in FIG. 16, erase operations may be performed in parallel in a plurality of plane units PU in the same stream STM. The latency of the erase operation is shorter than that of the write operation. The frequency of performing the erase operation is lower than that of performing the write operation. Thus, the frequency of collision between the read operation and the erase operation is lower than that of collision between the read operation and the write operation. If erase operations are performed parallel, a processing time of the erase operations can be decreased.

1.5.2 Second Modification of First Embodiment

Figure 17:
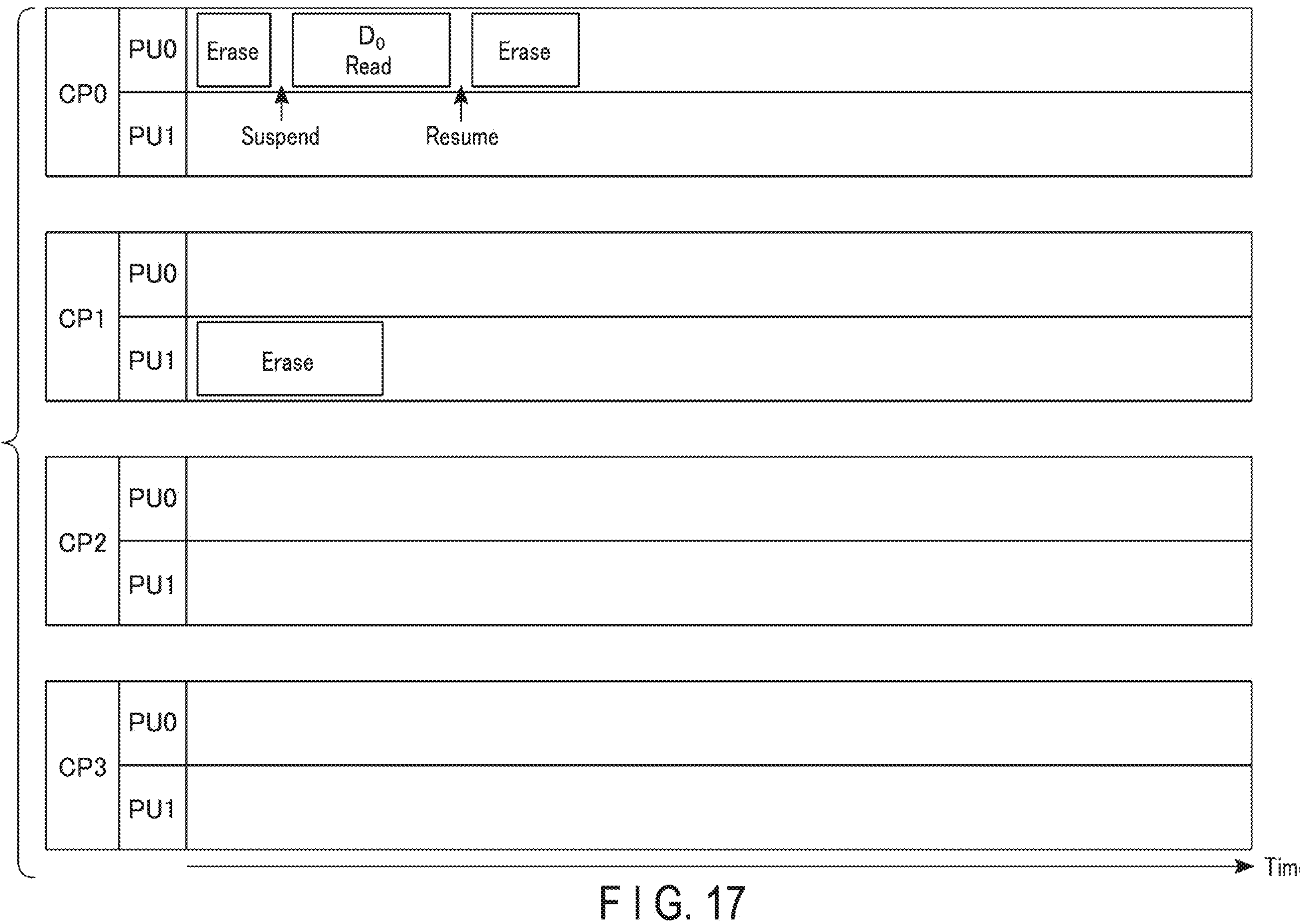
FIG. 17 is a diagram showing a specific example of the read operation in a memory system according to a second modification of the first embodiment.

Next is a description of a second modification of the first embodiment. In the second modification, an erase operation is suspended to perform a read operation. FIG. 17 is a diagram showing a specific example of the read operation.

As shown in FIG. 17, upon receiving a read request during the erase operation, the read control unit 23 may suspend the erase operation and perform the read operation. After completion of the read operation, the read control unit 23 resumes the erase operation. The suspension of the erase operation can suppress the tail latency of the read operation from increasing.

1.5.3 Third Modification of First Embodiment

Next is a description of a third modification of the first embodiment. In the third modification, write operations or erase operations of two memory chips CP are performed in the same stream STM with parts of the processing time of the operations overlapped with each other.

1.5.3.1 Flow of Write Operation

Figure 18:
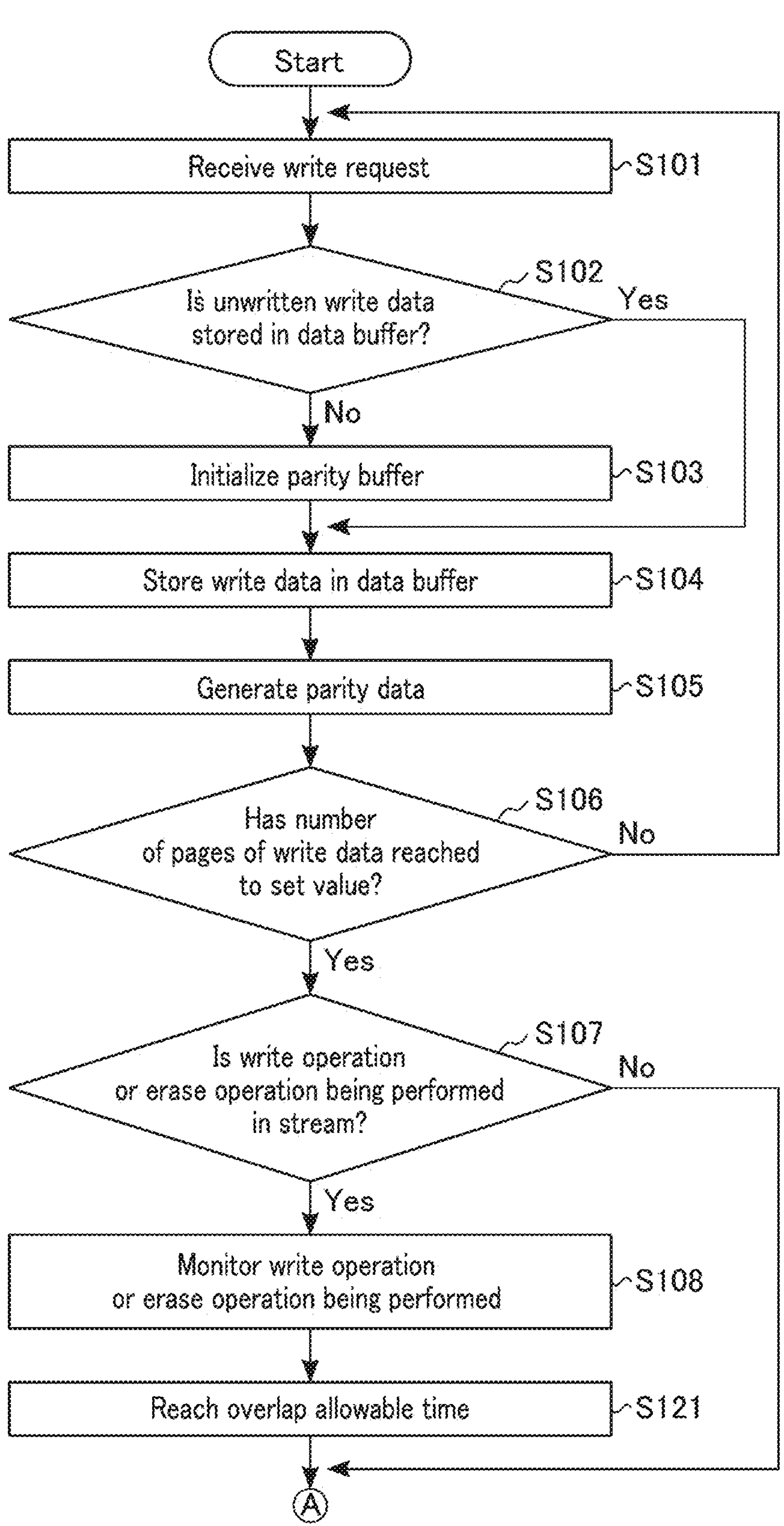
FIG. 18 is a flowchart of a write operation in a memory system according to a third modification of the first embodiment.

First, an example of a flow of a write operation will be described with reference to FIGS. 18 and 19. FIGS. 18 and 19 are a flowchart of the write operation. The description will focus on differences from FIGS. 11 and 12 of the first embodiment.

As shown in FIG. 18, the operation from S101 to S108 is the same as that in FIG. 11 of the first embodiment.

The write monitoring unit 222 monitors a write operation or an erase operation which is being performed (S108) and notifies the stream 0 control unit 221*a* of a time at which the write operation or the erase operation is completed.

The stream 0 control unit 221*a* calculates from the completion time the overlap allowable time of the write operation or the erase operation which is being performed. If the overlap allowable time is reached (S121), the stream 0 control unit 221*a* releases the standby state for next write operation or next erase operation.

As shown in FIG. 19, if the overlap allowable time in S121 is reached or if neither the write operation nor the erase operation is being performed in the stream STM0 (No in S107), the stream 0 control unit 221*a* selects domains DM and memory chips CP to which one-page data in the stream 0 buffer 271*a* is written (S110). More specifically, for example, the stream 0 control unit 221*a* selects the plane PLN0 of the domain DM0 of each of the memory chips CP0_0, CP1_0, CP2_0 and CP3_0.

The operation after S110 is the same as that shown in FIG. 12 of the first embodiment.

1.5.3.2 Specific Example of Overlap

Figure 20:
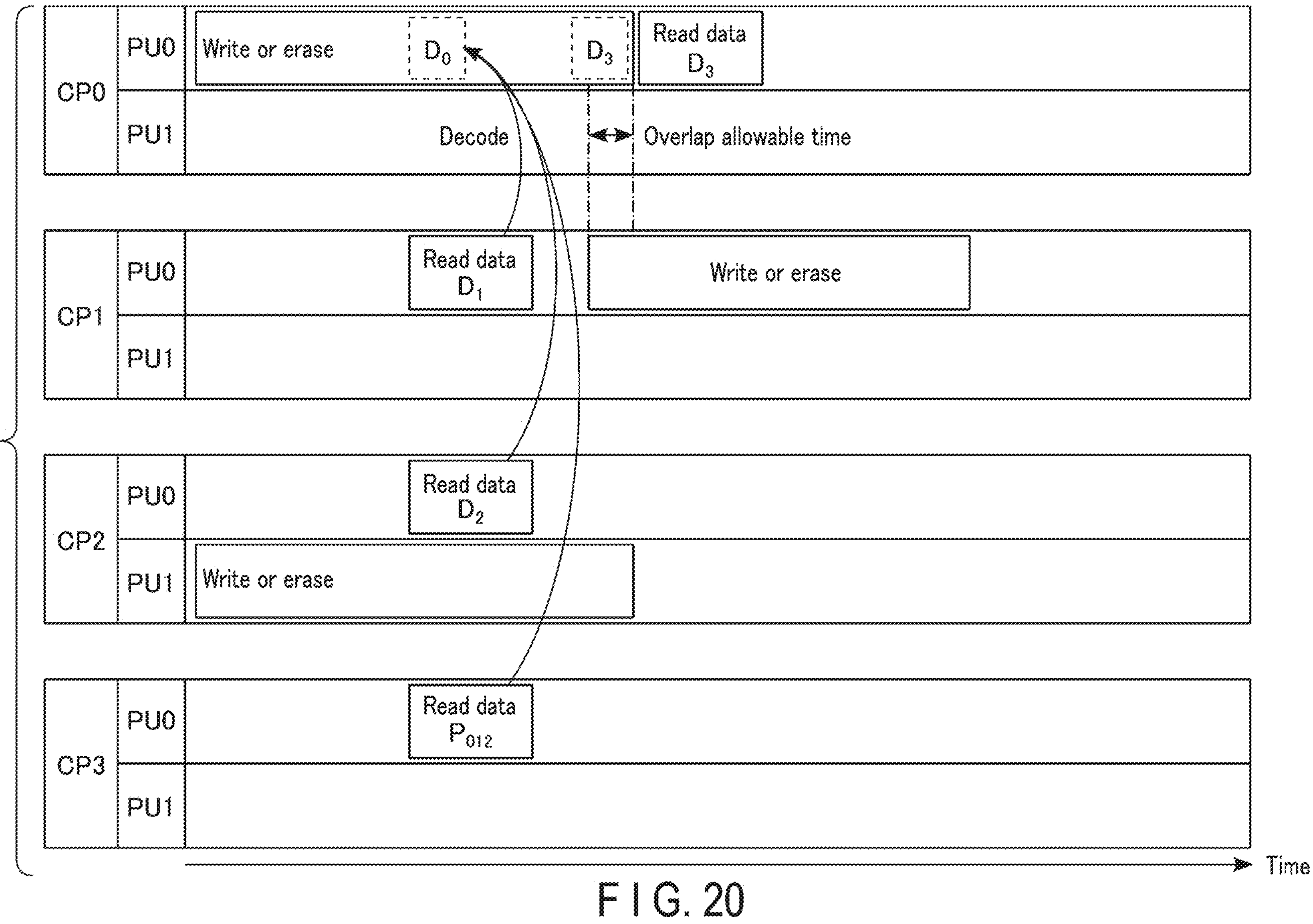
FIG. 20 is a diagram showing a specific example of a write operation and a read operation in the memory system according to the third modification of the first embodiment.

A specific example of overlap will be described below with reference to FIG. 20. FIG. 20 is a diagram showing a specific example of a write operation and a read operation. Hereinafter, the description will focus on the write operation and the read operation corresponding to the stream STM0.

As shown in FIG. 20, the write operation or the erase operation is being performed in, for example, each of the plane unit PU0 of the memory chip CP0 and the plane unit PU1 of the memory chip CP2.

In this state, if the write operation or the erase operation reaches the overlap allowable time in the plane unit PU0 of the memory chip CP0, the stream 0 control unit 221*a* starts the write operation or the erase operation in the plane unit PU0 of the memory chip CP1, for example.

Next is a description of a read operation corresponding to overlap. For example, the write operation or the erase operation is being performed in the plane unit PU0 of the memory chip CP0. In this state, the read control unit 23 receives a read request for data $D_0$ of the plane unit PU0 of the memory chip CP0. For example, if the parity read operation does not collide with the next write operation or the next erase operation to be overlapped, the read control unit 23 performs the parity read operation to decode the data $D_0$. More specifically, for example, if the read operation of data $D_1$ does not collide with the next write operation or the next erase operation to be overlapped in the plane unit PU0 of the memory chip CP1, the read control unit 23 performs the parity read operation.

For example, the read control unit 23 receives a read request for data $D_3$ of the plane unit PU0 of the memory chip CP0. If a parity read operation corresponding to the data $D_3$ is performed, it collides with the next write operation or the next erase operation to be overlapped in the plane unit PU0 of the memory chip CP1. In this case, the read control unit 23 does not select the parity read operation but performs a normal read operation of the data $D_3$ when the write operation or the erase operation is completed in the plane unit PU0 of the memory chip CP0.

1.5.4 Advantages of Modifications of First Embodiment

The configurations according to the first to third modifications of the first embodiment bring about the same advantages as those of the first embodiment.

In the configuration according to the first modification of the first embodiment, erase operations can be performed in parallel in a plurality of plane units PU in the same stream STM. Thus, the processing capability of the erase operations can be improved.

In the configuration according to the second modification of the first embodiment, an erase operation can be suspended to perform a read operation. Thus, the tail latency of the read operation can be suppressed from increasing.

In the configuration according to the third modification of the first embodiment, two write operations or two erase operations can be performed in the same stream STM with parts of the processing time overlapped with each other. Thus, the processing capability of the write operation or erase operation can be improved.

Note that the first to third modification may be combined with each other. For example, the first and second modifications may be combined. If erase operations are performed in parallel in, for example, a plurality of plane units PU in the same stream STM, they may be suspended and a normal read operation may be performed in a read target memory chip.

2. Second Embodiment

A second embodiment will be described below. The second embodiment includes six examples of a read operation that differs from that of the first embodiment. Hereinafter, the description will focus on differences from the first embodiment.

2.1 First Example

A first example of the second embodiment will be described first.

2.1.1 Flow of Read Operation

Figure 21:
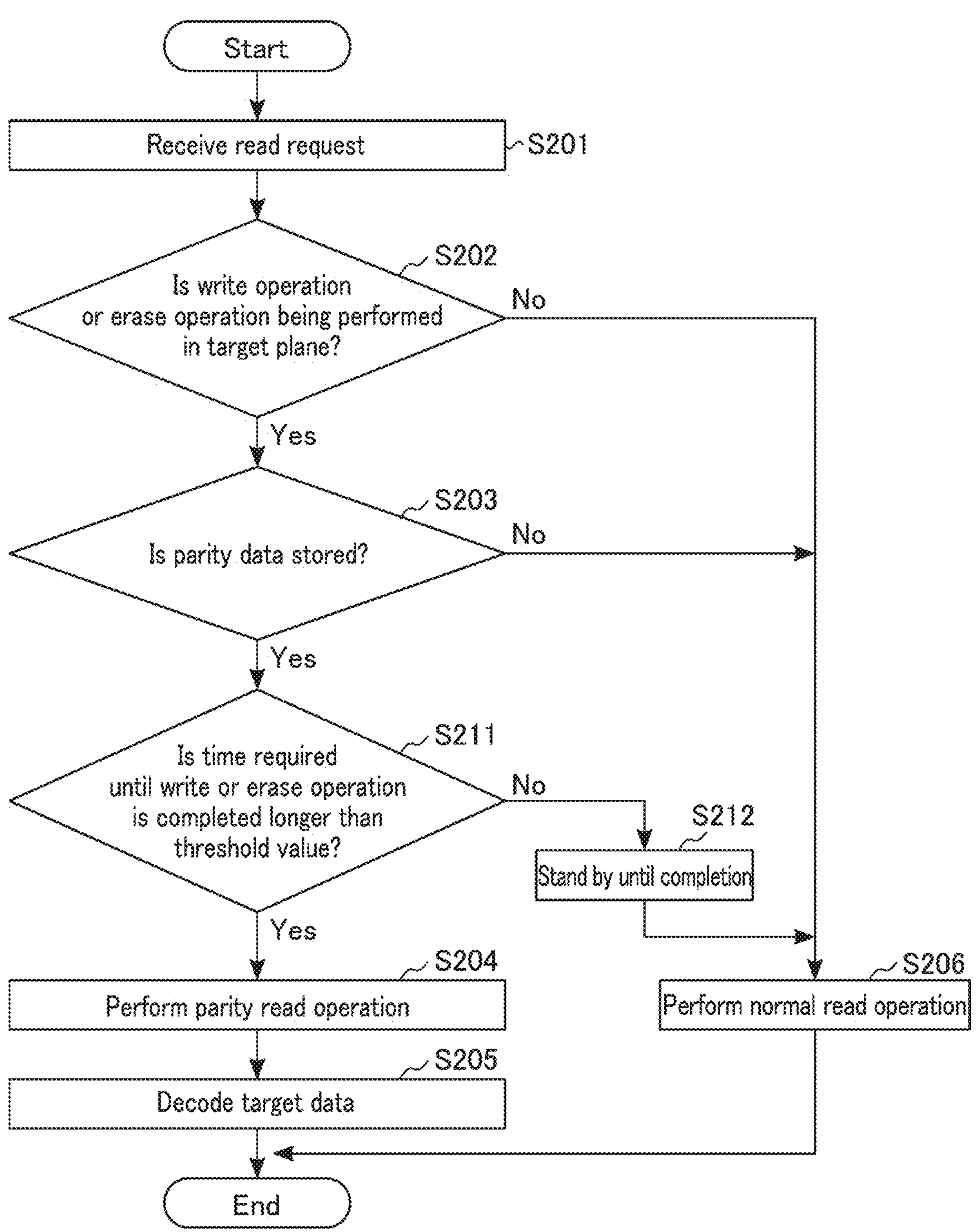
FIG. 21 is a flowchart of a read operation in a memory system according to a first example of a second embodiment.

An example of a flow of a read operation will be described with reference to FIG. 21. FIG. 21 is a flowchart of the read operation.

As shown in FIG. 21, the operation from S201 to S203 is the same as that in FIG. 14 of the first embodiment.

If the parity data is stored (Yes in S203), the read control unit 23 confirms whether a length of time required until the write operation or the erase operation is completed is longer than a preset threshold value (S211).

If the length of time is longer than the preset threshold value (Yes in S211), the read control unit 23 performs the parity read operation (S204).

The read control unit 23 controls the error correction circuit 24 to perform the erasure correction decoding process using the read data and then decode read target data (S205).

If the length of time is equal to or shorter than the preset threshold value (No in S211), the read control unit 23 stands by until the write operation or the erase operation is completed (S212).

If neither the write operation nor the erase operation is being performed (No in S202) or if no parity data is stored (No in S203) or if the standby state in S212 is released, the read control unit 23 performs the normal read operation for the read target data (S206).

2.1.2 Specific Example of Read Operation

A specific example of a read operation will be described below with reference to FIG. 22. FIG. 22 is a diagram showing a specific example of the read operation.

As shown in FIG. 22, the write operation or the erase operation is being performed in, for example, each of the plane unit PU0 of the memory chip CP0 and the plane unit PU1 of the memory chip CP1.

In this state, for example, the read control unit 23 receives a read request to read data $D_0$ of the plane unit PU0 of the memory chip CP0. If the length of time required from the reception of the read request to read data $D_0$ to the completion of the write operation or the erase operation is longer than a threshold value, the read control unit 23 performs the parity read operation. For example, the read control unit 23 reads data $D_1$ and data $D_2$ and the parity data $P_{012}$ to decode the data $D_0$.

In addition, for example, the read control unit 23 receives a read request to read data $D_3$ of the plane unit PU0 of the memory chip CP0. If the length of time required from the reception of the read request to read data $D_3$ to the completion of the write operation or the erase operation is equal to or shorter than the threshold value, the read control unit 23 performs the normal read operation for the data $D_3$ if the write operation or the erase operation of the plane unit PU0 of the memory chip CP0 is completed.

2.2 Second Example

Next is a description of a second example of the second embodiment. FIG. 23 is a flowchart of a read operation.

As shown in FIG. 23, first, the memory controller 20 receives a read request from the host device 2 (S201).

The read control unit 23 confirms whether read target data can be read immediately from the target plane PLN of a target memory chip CP (S221). In other words, the read control unit 23 confirms whether a standby time period is required until the normal reading operation can be performed. For example, if an operation (the write operation, the erase operation, or the read operation) is being performed in the target plane PLN or if a plurality of commands are stacked in a command queue corresponding to the target plane PLN (that is, if a plurality of operation are reserved), the read control unit 23 determines that the read operation cannot be performed immediately.

If the read operation cannot be performed immediately (No in S221), the read control unit 23 confirms whether parity data corresponding to the read target data is stored in the read buffer 28 or another memory chip CP (S203).

If the parity data is stored (Yes in S203), the read control unit 23 estimates a normal read operation completion time of the read target data and a parity read operation completion time. Then, the read control unit 23 confirms whether the parity read operation completion time is earlier than the normal read operation completion time by a certain time or more. That is, the read control unit 23 confirms whether a difference between the normal read operation completion time and the parity read operation completion time is longer than a preset threshold value (S222).

If the difference is greater than the preset threshold value (Yes in S222), the read control unit 23 performs the parity read operation (S204).

The read control unit 23 controls the error correction circuit 24 to perform the erasure correction decoding process using the read data to decode the read target data (S205).

If the difference is equal to or less than the preset threshold value (No in S222), the read control unit 23 stands by until the operation of the commands stacked in the command queue corresponding to the target plane PLN of the target memory chip CP are completed to enable the normal read operation (S223).

If the read operation can be performed immediately (Yes in S221) or if no parity data is stored (No in S203) or if the standby state in S223 is released, the read control unit 23 performs the normal read operation of the read target data (S206).

2.3 Third Example

Next is a description of a third example of the second embodiment. FIG. 24 is a flowchart of a read operation.

As shown in FIG. 24, first, the memory controller 20 receives a read request from the host device 2 (S201).

As in S221 of the second example of the second embodiment, the read control unit 23 confirms whether read target data can be read immediately from the target plane PLN of a target memory chip CP (S231).

If the read target data cannot be read immediately (No in S231), the read control unit 23 confirms whether parity data corresponding to the read target data is stored in the read buffer 28 or another memory chip CP (S203).

If the parity data is stored (Yes in S203), the read control unit 23 confirms whether a congestion degree of the target memory chip CP is greater than a preset threshold value (S232). For example, the read control unit 23 determines a congestion degree based on the type and number of commands stacked in the command queue corresponding to the target memory chip CP.

If the congestion degree of the target memory chip CP is higher than the preset threshold value (Yes in S232), the read control unit 23 performs the parity read operation (S204).

The read control unit 23 controls the error correction circuit 24 to perform the erasure correction decoding process using the read data and then decode the read target data (S205).

If the congestion degree of the target memory chip CP is equal to or lower than the preset threshold value (No in S232), the read control unit 23 stands by until the operation of commands stacked in the command queue is completed to enable the normal read operation (S233).

If the read target data can be read immediately (Yes in S231) or if no parity data is stored (No in S203) or if the standby state in S233 is released, the read control unit 23 performs the normal read operation for the read target data (S206).

2.4 Fourth Example

Figure 25:
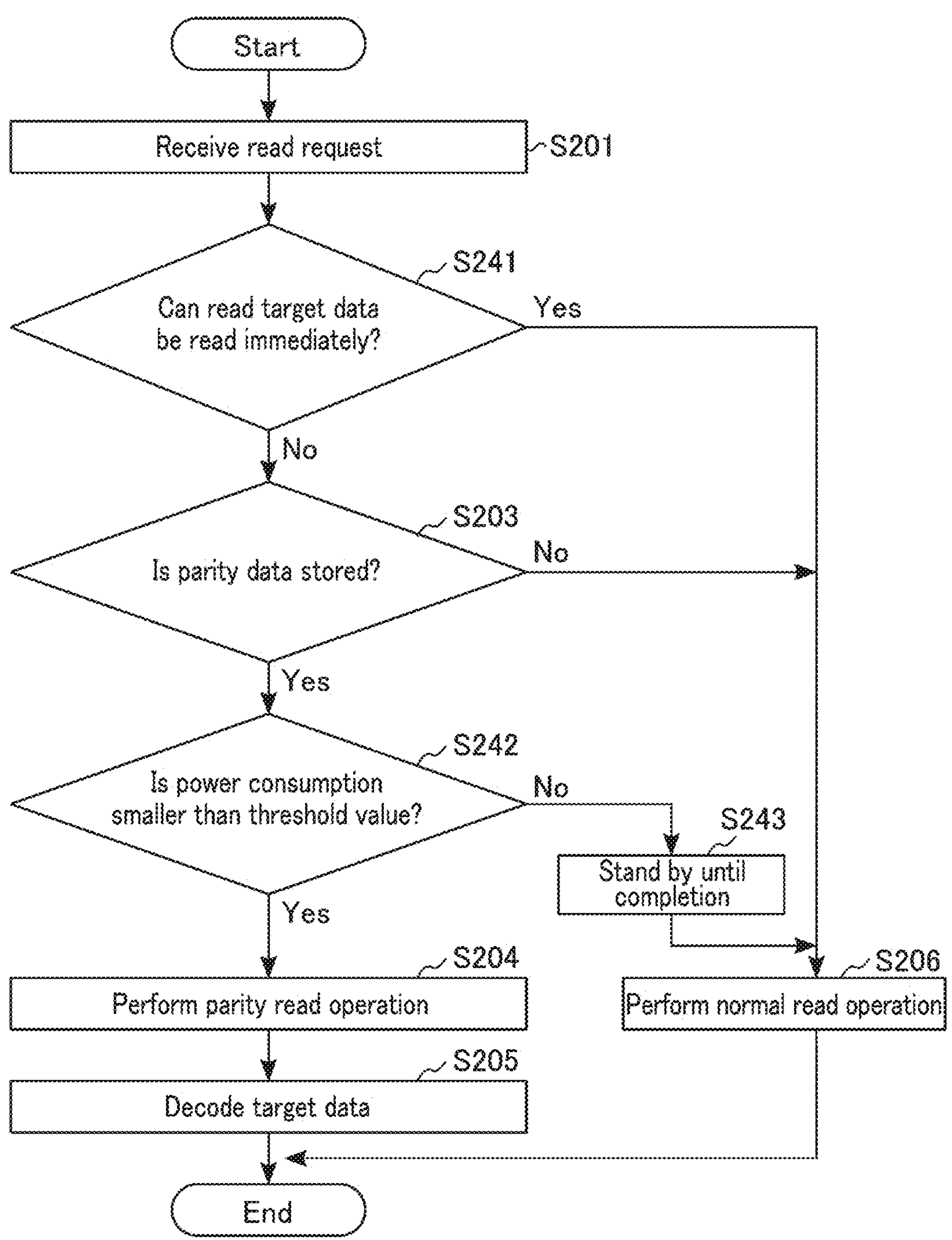
FIG. 25 is a flowchart of a read operation in a memory system according to a fourth example of the second embodiment.

Next is a description of a fourth example of the second embodiment. FIG. 25 is a flowchart of a read operation.

As shown in FIG. 25, first, the memory controller 20 receives a read request from the host device 2 (S201).

As in S221 of the second example of the second embodiment, the read control unit 23 confirms whether read target data can be read immediately from the target plane PLN of a target memory chip CP (S241).

If the read target data cannot be read immediately (No in S241), the read control unit 23 confirms whether parity data corresponding to the read target data is stored in the read buffer 28 or another memory chip CP (S203).

If the parity data is stored (Yes in S203), the read control unit 23 confirms whether the power consumption of the memory system 3 is smaller than a preset threshold value (S242).

If the power consumption is smaller than the preset threshold value (Yes in S242), the read control unit 23 performs the parity read operation (S204).

The read control unit 23 controls the error correction circuit 24 to perform an erasure correction decoding process using the read data and then decode the read target data (S205).

If the power consumption is equal to or larger than the preset threshold value (No in S242), the read control unit 23 stands by until the operation of the commands stacked in the command queue is completed to enable the normal read operation (S243).

If the read target data can be read immediately (Yes in S241) or if no parity data is stored (No in S203) or if the standby state in S243 is released, the read control unit 23 performs the normal read operation for the read target data (S206).

2.5 Fifth Example

Next is a description of a fifth example of the second embodiment.

2.5.1 Configuration of Read Control Unit

First, an example of a configuration of the read control unit 23 will be described with reference to FIG. 26. FIG. 26 is a block diagram showing the configuration of the read control unit 23.

As shown in FIG. 26, the parity decoding determination circuit 231 of the fifth example includes a determination unit 232.

If all of the determinations based on a plurality of determination conditions are true, the determination unit 232 outputs "true" as a determination result. For example, the determination unit 232 determines authenticity based on three determination conditions. Under a first one of the three determination conditions, it is determined as true if a difference between a normal read operation completion time and a parity read operation completion time is longer than a preset threshold value. Under a second one of the determination conditions, it is determined as true if a congestion degree of the target memory chip CP is higher than a preset threshold value. Under a third one of the determination conditions, it is determined as true if power consumption is smaller than a preset threshold value. Note that the above three determination conditions are not restrictive ones.

The parity decoding determination circuit 231 determines that the parity read operation is to be performed if the determination result of the determination unit 232 is true.

2.5.1 Flow of Read Operation

Figure 27:
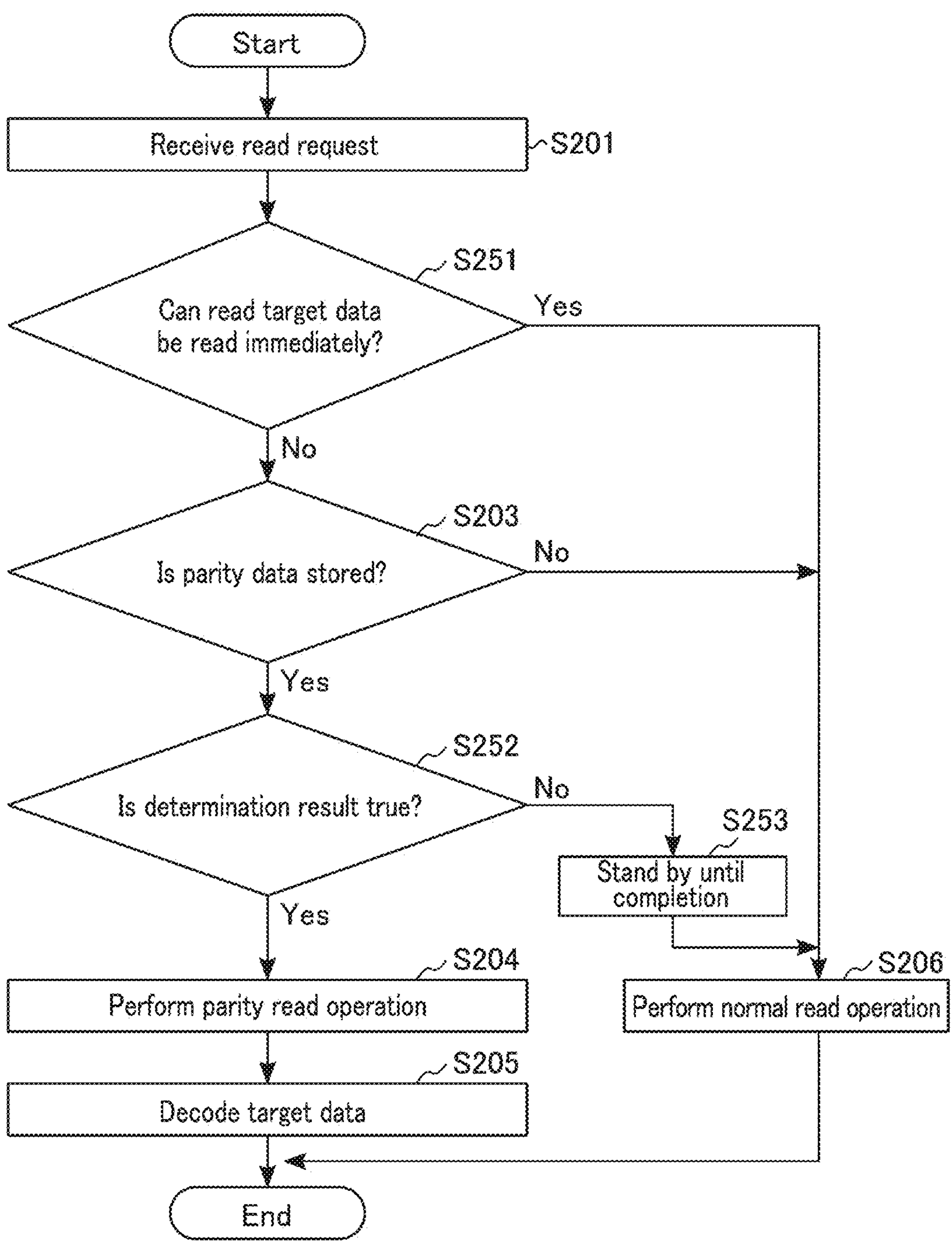
FIG. 27 is a flowchart of a read operation in the memory system according to the fifth example of the second embodiment.

An example of a flow of a read operation will be described below with reference to FIG. 27. FIG. 27 is a flowchart of the read operation.

As shown in FIG. 27, first, the memory controller 20 receives a read request from the host device 2 (S201).

As in S221 of the second example of the second embodiment, the read control unit 23 confirms whether read target data can be read immediately from the target plane PLN of a target memory chip CP (S251).

If the read target data cannot be read immediately (No in S251), the read control unit 23 confirms whether parity data corresponding to the read target data is stored in the read buffer 28 or another memory chip CP (S203).

If the parity data is stored (Yes in S203), the read control unit 23 confirms whether the determination result of the determination unit 232 is true (S252).

If the determination result is true (Yes in S252), the read control unit 23 performs the parity read operation (S204).

The read control unit 23 controls the error correction circuit 24 to perform the erasure correction decoding process using the read data and then decode the read target data (S205).

If the determination result is not true, that is, if it is false (No in S252), the read control unit 23 stands by until the operation of commands stacked in the command queue is completed to enable a normal read operation (S253).

If the read target data can be read immediately (Yes in S251) or if no parity data is stored (No in S203) or if the standby state in S253 is released, the read control unit 23 performs the normal read operation for the read target data (S206).

2.6 Sixth Example

Figure 28:
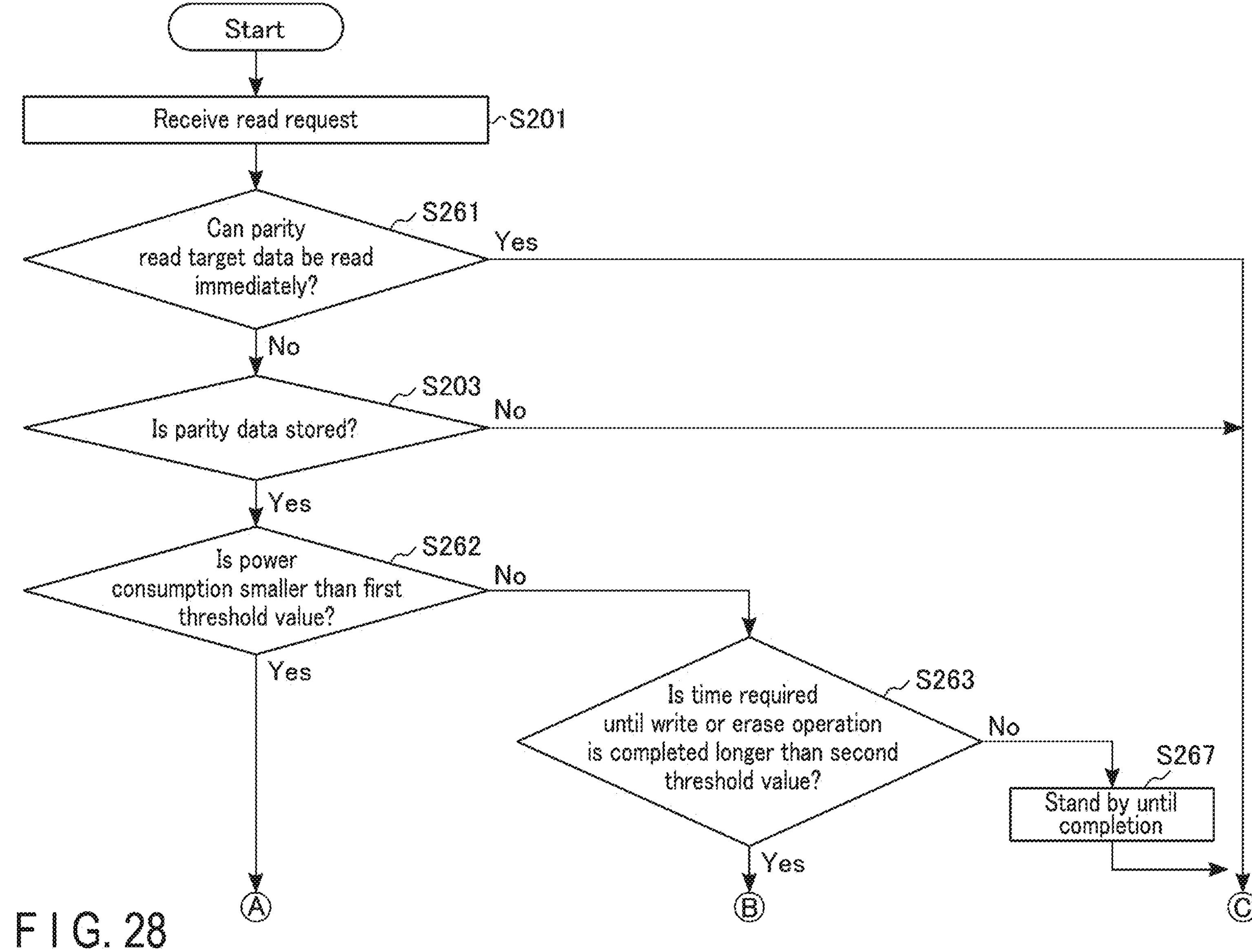
FIG. 28 is a flowchart of a read operation in a memory system according to a sixth example of the second embodiment.

Next is a description of a sixth example of the second embodiment. FIGS. 28 and 29 are a flowchart of a read operation.

As shown in FIG. 28, first, the memory controller 20 receives a read request from the host device 2 (S201).

As in S221 of the second example of the second embodiment, the read control unit 23 confirms whether read target data can be read immediately from the target plane PLN of the target memory chip CP (S261).

If the read target data cannot be read immediately (No in S261), the read control unit 23 confirms whether parity data corresponding to the read target data is stored in the read buffer 28 or another memory chip CP (S203).

If the parity data is stored (Yes in S203), the read control unit 23 confirms the power consumption of the memory system 3 as in S242 of the fourth example of the second embodiment (S262).

As shown in FIG. 29, if the power consumption is smaller than a preset first threshold value (Yes in S262), the read control unit 23 performs the parity read operation (S204).

The read control unit 23 controls the error correction circuit 24 to perform the erasure correction decoding process using the read data and then decode the read target data (S205).

If the power consumption is smaller than the preset first threshold value (No in S262), the read control unit 23 confirms whether the length of time required until the write operation or the erase operation is completed is longer than a preset second threshold value (S263), as in S211 of the first example of the second embodiment.

If the length of time is longer than the preset second threshold value (Yes in S263), the read control unit 23 suspends the write operation or the erase operation (S264). After the suspension, the read control unit 23 performs the normal read operation of the read target data (S265). After completion of the normal read operation, the read control unit 23 resumes the suspended write operation or erase operation (S266).

If the length of time is equal to or shorter than the preset threshold value (No in S263), the read control unit 23 stands by until the operation of the commands stacked in the command queue is completed and the normal read operation is enabled (S267).

If the read target can be read immediately (Yes in S261) or if no parity data is stored (No in S203) or if the standby state in S267 is released, the read control unit 23 performs the normal read operation of the read target data (S268).

2.7 Advantages of Second Embodiment

The configuration according to the second embodiment can bring about the same advantages as those of the first embodiment.

In the configuration according to the first example of the second embodiment, if the time required until the write operation or the erase operation is completed is equal to or shorter than a threshold value, the read control unit 23 does not perform the parity read operation but can select the normal read operation. Thus, the probability of collision between the parity read operation and its subsequent write operation or erase operation can be decreased. Therefore, the memory system 3 can be improved in its write performance. In addition, the total number of times of performance of the read operation can be reduced more than that of the parity read operation. Thus, the probability of collision between the read operations of the planes PLN in the domain DM can also be decreased. Therefore, the tail latency of the read operation due to the congestion of the read operation can also be suppressed from increasing.

In the configuration according to the second example of the second embodiment, if a difference between a normal read operation completion time and a parity read operation completion time is equal to or smaller than a preset threshold value, that is, if the difference is relatively small, the read control unit 23 does not perform the parity read operation but can select the normal read operation. Thus, the probability of collision between the parity read operation and its subsequent write operation can be decreased. Therefore, the memory system 3 can be improved in its write performance.

In the configuration according to the third example of the second embodiment, if the congestion degree of the read target memory chip CP is lower than a threshold value, the read control unit 23 does not perform the parity read operation but can select the normal read operation. Thus, the congestion degree of the memory chip CP that is a target for the parity read operation can be suppressed from increasing.

In the configuration according to the fourth example of the second embodiment, if the power consumption of the memory system 3 is equal to or larger than a threshold value, the read control unit 23 does not perform the parity read operation but can select the normal read operation. Thus, the memory system 3 can suppress the power consumption from increasing.

The configuration according to the fifth example of the second embodiment can bring about the same advantages as those of the second to fourth examples of the second embodiment.

In the configuration according to the sixth example of the second embodiment, if the power consumption of the memory system 3 is equal to or larger than the first threshold value and if the length of time required until the write operation or the erase operation is completed is longer than the second threshold value, the read control unit 23 can suspend the operation. After the suspension, the read control unit 23 can perform the normal read operation. Then, the read control unit 23 can resume the suspended operation. Thus, the memory system 3 can suppress the tail latency of the read operation from increasing. Therefore, the memory system 3 can be improved in its processing capability.

3. Third Embodiment

Next is a description of a third embodiment. The third embodiment is directed to a data read operation in garbage collection. Hereinafter, the description will focus on differences from the first and second embodiments.

The garbage collection is also referred to as compaction. The garbage collection is a process of reading (collecting) valid data from a plurality of blocks BLK and rewriting (copying) it to another block BLK. The blocks BLK from which data has been read by the garbage collection are erasable. If data is rewritten in the nonvolatile memory 10, new data is written to other memory cell transistors (cell unit CU). Therefore, as data rewrite progresses, invalid data increases in the blocks BLK. If even one valid piece of data remains in a block BLK, the erase operation of the block BLK cannot be performed. For example, if the number of erasable blocks BLK decreases, the garbage collection is performed.

3.1 Read Operation in Garbage Collection

Figure 30:
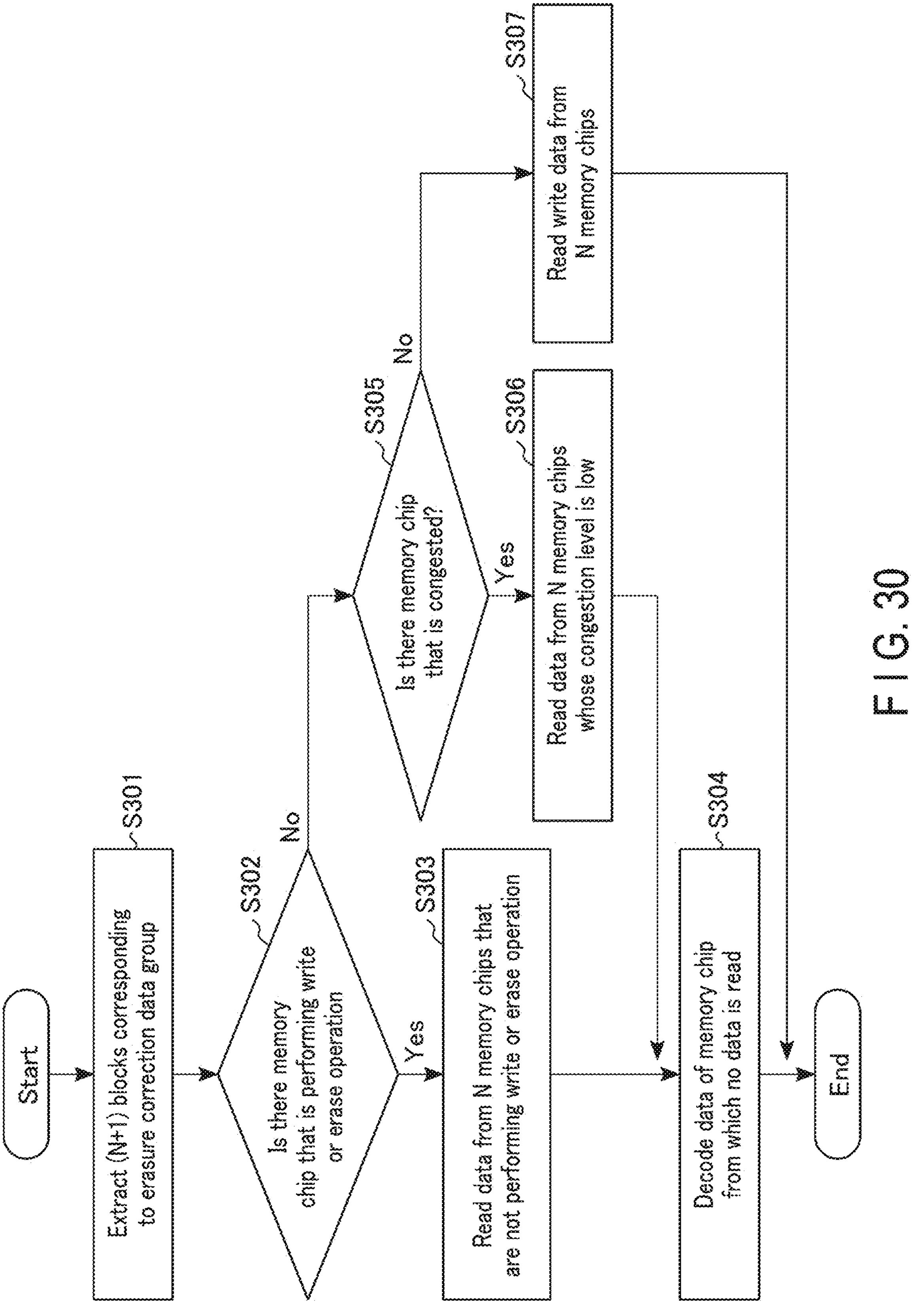
FIG. 30 is a flowchart of a read operation for garbage collection in a memory system according to a third embodiment.

An example of a flow of a read operation in garbage collection will be described with reference to FIG. 30. FIG. 30 is a flowchart of the read operation in garbage collection. In the read operation in the garbage collection in the third embodiment, data of a plurality of blocks BLK corresponding to an erasure correction data group are read collectively. In the following description, the erasure correction data group includes N pieces of write data (N is an integer) and one piece of parity data. Note that the read operation of the third embodiment can be used, for example, in reading erasure correction data groups collectively, such as a sequential read operation. The sequential read operation is a read operation of collectively reading data of a plurality of pages stored in a cell unit CU.

As shown in FIG. 30, the read control unit 23 extracts (N+1) blocks BLK including (N+1) pieces of data corresponding to the erasure correction data group (S301). The extracted (N+1) blocks BLK are included in the plane units PU of different memory chips CP in the stream STM.

The read control unit 23 confirms whether there is a memory chip CP that is performing the write operation or the erase operation (S302).

If there is the memory chip CP that is performing the write operation or the erase operation (Yes in S302), the read control unit 23 reads data of the target blocks BLK of N memory chips CP excluding the memory chip CP that is performing the write operation or the erase operation (S303).

If there is no memory chip CP that is performing the write operation or the erase operation (No in S302), the read control unit 23 confirms a congestion degree of each memory chip CP (S305).

If there is a memory chip CP that is congested (Yes in S305), the read control unit 23 reads data of target blocks BLK of N memory chips CP whose congestion degree is low (S306). More specifically, for example, if the congestion degree of the memory chip CP, which is the highest, is a preset threshold value, the read control unit 23 determines that the memory chip CP is congested. Then, the read control unit 23 reads data of target blocks BLK of N memory chips CP excluding the memory chip CP whose congestion degree is the highest.

If the data of the target blocks BLK of N memory chips CP is read in step S303 or S306, the read control unit 23 uses the read data to decode data of target block BLK of memory chip CP from which no data is read (S304).

If there is no congested memory chip CP (No in S305), the read control unit 23 reads write data of target blocks BLK of N memory chips CP corresponding to the write data (S307).

3.2 Advantages of Third Embodiment

The configuration according to the third embodiment can bring about the same advantages as those of the first and second embodiments.

4. Modification and the Like

The memory system according to above embodiments includes a plurality of memory chips (CP) each including a first memory area (PU0) and a second memory area (PU1) and a memory controller (20). The memory controller is configured to control a first group (STM0) including a plurality of first memory areas and a second group (STM1) including a plurality of second memory areas independently of each other, form a data group (erasure correction data group) including a plurality of write data items of respective pages and first data including an erasure correction code corresponding to the write data items, and distribute each of the write data items and the first data of the data group in the plurality of first memory areas of the first group and write the distributed write data items and first data at different timings.

The foregoing first to third embodiments provide a memory system that is improved in its processing capability.

The first to third embodiments can be combined to the extent possible.

The term "coupled" in the first to third embodiments implies indirectly coupling something to something via a transistor, a resistor or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:

first to n-th (n is an integer of two or more) memory chips each including a first memory area and a second memory area; and a memory controller configured to control a first group including a plurality of first memory areas included in each of the first to the n-th memory chips and a second group including a plurality of second memory areas included in each of the first to the n-th memory chips independently of each other, wherein the memory controller is further configured to:

form a data group including a plurality of write data items of respective pages and first data including an erasure correction code corresponding to the write data items;

distribute each of the write data items and the first data of the data group in the plurality of first memory areas included in the first group to write the distributed write data items and first data; and be able to perform a read operation in the second memory area of the first memory chip while performing one of a write operation and an erase operation in the first memory area of the first memory chip, and in a case that the first memory chip is performing the one of the write operation and the erase operation, the memory controller is further configured to, based on a read request of a first write data item written in the first memory chip among the plurality of write data items of the data group, obtain the first write data item by reading data from the plurality of first memory areas included in each of the second to the n-th memory chips and decoding the read data.

2. The memory system of claim 1, wherein the memory chips further include a second memory chip, and the memory controller is configured to:

perform the read operation in the first memory area of the second memory chip while performing one of the write operation and the erase operation in the first memory area of the first memory chip; and perform one of the write operation, the erase operation, and the read operation in the second memory area of the second memory chip.

3. The memory system of claim 1, wherein each of the first memory area and the second memory area includes a plurality of memory cell arrays, and the memory cell arrays are coupled to different sense amplifiers and different row decoders.

4. The memory system of claim 3, wherein the memory cell arrays of the first memory area include a first memory cell array which is included in a first management unit, the memory cell arrays of the second memory area include a second memory cell array which is included in the first management unit, and the memory controller is configured to manage the second memory cell array so that one of a write operation and an erase operation is not performed in the second memory cell array while performing one of the write operation and the erase operation in the first memory cell array.

5. The memory system of claim 3, wherein the memory controller is configured to manage the second memory cell array so that a read operation is not performed in the second memory cell array while performing the read operation in the first memory cell array.

6. The memory system of claim 4, wherein the memory cell arrays in the first memory area include a third memory cell array which is included in a second management unit, and the memory controller is configured to performs write operations or erase operations in parallel in the first memory cell array and the third memory cell array.

7. The memory system of claim 1, wherein the memory controller includes a first buffer in which the write data items are stored and a second buffer in which the first data is stored, and the memory controller is configured to repeat storing the write data items in the first buffer and generating the first data until a number of pages of the write data items stored in the first buffer reach a preset number of pages in a write operation of the data group.

8. The memory system of claim 7, wherein when one of a write operation and an erase operation for data other than data of the data group is performed in the first group, the memory controller is configured to:

monitor the one of the write operation and the erase operation; and perform the write operation of the data group after the one of the write operation and the erase operation is completed.

9. The memory system of claim 1, wherein the memory controller is configured to perform a write operation of the first group and a write operation of the second group in parallel.

10. The memory system of claim 1, wherein the memory controller is configured to perform a plurality of write operations corresponding to each of the write data items and the first data without overlapping with each other.

11. The memory system of claim 1, wherein the memory controller is configured to perform erase operations in parallel in each of the plurality of first memory areas.

12. The memory system of claim 1, wherein the memory controller is configured to suspend an erase operation and perform a read operation when the erase operation is being performed in the first group.

13. The memory system of claim 1, wherein the memory controller is configured to perform one of a plurality of write operations and another one of the write operations in such a manner that a period in which the one of the plurality of write operations is performed and a period in which the another one of the plurality of write operations is performed are partially overlapped, the write operations corresponding to each of the write data items and the first data.

14. The memory system of claim 1, wherein the memory chips include a first memory chip, the write data items includes a first write data item, and in a case where the first memory chip is performing one of a write operation and an erase operation when the first write data item is read from the first memory chip, the memory controller is configured to:

confirm a length of time required until the one of the write operation and the erase operation is completed, read data other than the first write data item included in the data group from memory chips other than the first memory chip to decode the first write data item when the length of time is longer than a preset threshold value; and read the first write data item from the first memory chip when the length of time is equal to or shorter than the threshold value.

15. The memory system of claim 1, wherein the memory chips include a first memory chip, the write data items includes first write data item, and in a case where a standby period occurs when a first read operation is performed to read the first write data item from the first memory chip, the memory controller is configured to:

confirm a length of first time required until the first read operation is completed and a length of second time required until a second read operation to read data other than the first write data item included in the data group from memory chips other than the first memory chips is completed;

perform the second read operation when a difference between the length of first time and the length of second time is greater than a preset threshold value; and perform the first read operation when the difference is equal to or less than the present threshold value.

16. The memory system of claim 1, wherein the memory chips include a first memory chip, the write data items includes a first write data item, and in a case where a standby period occurs when a first read operation is performed to read the first write data item from the first memory chip, the memory controller is configured to:

confirm a congestion degree of the first memory chip;

perform a second read operation to read data other than the first write data item included in the data group from memory chips other than the first memory chips when the congestion degree is higher than a preset threshold value; and perform the first read operation when the congestion degree is equal to or lower than the threshold value.

17. The memory system of claim 1, wherein the memory chips include a first memory chip, the write data items includes a first write data item, and in a case where a standby period occurs when a first read operation is performed to read the first write data item from the first memory chip, the memory controller is configured to:

confirm power consumption;

perform a second read operation to read data other than the first write data item included in the data group from memory chips other than the first memory chips when the power consumption is smaller than a preset first threshold value; and perform the first read operation when the power consumption is equal to or larger than the first threshold value.

18. The memory system of claim 17, wherein when the power consumption is equal to or larger than the first threshold value and a length of time required until one of a write operation and an erase operation in the first memory chip is completed is longer than a preset second threshold value, the memory controller is configured to suspend the one of the write operation and the erase operation and then perform the first read operation.

19. The memory system of claim 1, wherein the memory controller is configured to distribute each of the write data items and the first data of the data group in the plurality of first memory areas included in the first group to write the distributed write data items and first data at different timings.

20. The memory system of claim 1, wherein the first memory chip includes a plurality of first memory cells corresponding to one of the write operation and the erase operation being performed and a plurality of second memory cells storing the first write data item, the second memory cells being different from the first memory cells.

* * * * *